United States Patent
Chan et al.

(10) Patent No.: US 10,618,673 B2
(45) Date of Patent: Apr. 14, 2020

(54) SYSTEMS AND METHODS FOR DYNAMIC PLANNING AND OPERATION OF AUTONOMOUS SYSTEMS USING IMAGE OBSERVATION AND INFORMATION THEORY

(71) Applicants: Michael T. Chan, Bedford, MA (US); Ronald Duarte, Cambridge, MA (US)

(72) Inventors: Michael T. Chan, Bedford, MA (US); Ronald Duarte, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 82 days.

(21) Appl. No.: 15/488,182

(22) Filed: Apr. 14, 2017

(65) Prior Publication Data
US 2017/0301109 A1      Oct. 19, 2017

Related U.S. Application Data

(60) Provisional application No. 62/322,901, filed on Apr. 15, 2016.

(51) Int. Cl.
*G06K 9/00* (2006.01)
*B64D 47/08* (2006.01)
(Continued)

(52) U.S. Cl.
CPC ............ *B64D 47/08* (2013.01); *B64C 39/024* (2013.01); *G05D 1/0094* (2013.01);
(Continued)

(58) Field of Classification Search
CPC ........ B64D 47/08; G06K 9/00; G06K 9/0063; G06T 7/246; G06T 7/73;
(Continued)

(56) References Cited

U.S. PATENT DOCUMENTS 7,447,593 B2 * 11/2008 Estkowski ............. G01C 21/20
                                                        700/250
9,164,506 B1    10/2015 Zang
(Continued)

OTHER PUBLICATIONS

A. Qadir et al., "Implementation of an onboard visual tracking system with small Unmanned Aerial Vehicle (UAV)." International Journal of Innovative Technology and Creative Engineering, vol. 1, No. 10, p. 17-25 (Oct. 2011).
(Continued)

*Primary Examiner* — Jerome Grant, II
(74) *Attorney, Agent, or Firm* — McCarter & English, LLP

(57) ABSTRACT

Systems and methods described herein incorporate autonomous navigation using a vision-based guidance system. The vision-based guidance system enables autonomous trajectory planning and motion execution by the described systems and methods without feedback or communication with external operators. The systems and methods described herein can autonomously track an object of interest while seeking to obtain a diversity of views of the object of interest to aid in object identification. The systems and methods described include a robust reacquisition methodology. By handling navigation and tracking autonomously, systems described herein can react more quickly to non-cooperative moving objects of interest and can operate in situations where communications with external operators is compromised or absent.

28 Claims, 31 Drawing Sheets
(26 of 31 Drawing Sheet(s) Filed in Color)

(51) Int. Cl.
*G08G 5/00* (2006.01)
*G05D 1/00* (2006.01)
*B64C 39/02* (2006.01)
*G06T 7/73* (2017.01)
*G06T 7/246* (2017.01)
*G06K 9/62* (2006.01)

(52) U.S. Cl.
CPC ......... *G06K 9/0063* (2013.01); *G06K 9/6201* (2013.01); *G06T 7/246* (2017.01); *G06T 7/73* (2017.01); *G08G 5/0069* (2013.01); *B64C 2201/123* (2013.01); *B64C 2201/127* (2013.01); *B64C 2201/141* (2013.01); *G06T 2207/10032* (2013.01); *G06T 2207/30244* (2013.01)

(58) Field of Classification Search
CPC ........... G06T 2207/30244; G06T 2207/10032; G08G 5/0069; B64C 39/024; B64C 2201/127; B64C 2201/141; B64C 2201/123; G05D 1/0094
USPC .................................................. 382/102, 103
See application file for complete search history.

(56) References Cited

U.S. PATENT DOCUMENTS

| | | | |
|---|---|---|---|
| 2005/0083212 A1 | 4/2005 | Chew | |
| 2009/0174575 A1 | 7/2009 | Allen et al. | |
| 2010/0070343 A1 | 3/2010 | Taira et al. | |
| 2010/0195870 A1* | 8/2010 | Ai | G06T 7/277 382/103 |
| 2010/0250022 A1* | 9/2010 | Hines | G05D 1/101 701/2 |
| 2012/0106800 A1 | 5/2012 | Khan et al. | |
| 2012/0143808 A1* | 6/2012 | Karins | G06N 7/005 706/46 |
| 2012/0148092 A1 | 6/2012 | Ni et al. | |
| 2013/0030870 A1 | 1/2013 | Swinson et al. | |
| 2013/0088600 A1 | 4/2013 | Wu et al. | |
| 2013/0287248 A1 | 10/2013 | Gao et al. | |
| 2014/0037142 A1 | 2/2014 | Bhanu et al. | |
| 2014/0200744 A1* | 7/2014 | Molander | G05D 1/101 701/2 |
| 2014/0362230 A1 | 12/2014 | Bulan et al. | |
| 2016/0155339 A1* | 6/2016 | Saad | G05D 1/0295 701/25 |
| 2016/0277646 A1* | 9/2016 | Carr | H04N 5/23296 |
| 2017/0008521 A1* | 1/2017 | Braunstein | G01C 21/32 |
| 2017/0053167 A1* | 2/2017 | Ren | G06K 9/00624 |
| 2017/0177955 A1* | 6/2017 | Yokota | G06K 9/00791 |
| 2017/0301109 A1* | 10/2017 | Chan | G06T 7/75 |
| 2018/0109767 A1* | 4/2018 | Li | H04N 5/23206 |
| 2018/0120846 A1* | 5/2018 | Falk-Pettersen | G05D 1/0016 |
| 2018/0137373 A1* | 5/2018 | Rasmusson, Jr. | G01C 21/3638 |
| 2018/0158197 A1* | 6/2018 | Dasgupta | G05D 1/0094 |
| 2018/0188043 A1* | 7/2018 | Chen | G06T 7/11 |
| 2018/0189971 A1* | 7/2018 | Hildreth | G06T 7/70 |
| 2018/0246529 A1* | 8/2018 | Hu | G05D 1/0202 |
| 2019/0094888 A1* | 3/2019 | Hiroi | H04N 9/3182 |
| 2019/0196513 A1* | 6/2019 | Zhou | B64C 39/024 |
| 2019/0223237 A1* | 7/2019 | Hong | H04W 76/12 |
| 2019/0227540 A1* | 7/2019 | Suvitie | G01C 21/3453 |
| 2019/0287411 A1* | 9/2019 | Ozawa | G05D 1/101 |

OTHER PUBLICATIONS

A.E. Ortiz et al., "On Multi-UAV Scheduling for Human Operator Target Identification," American Control Conference (Jul. 1, 2011).
C. Stauffer et al, "Adaptive Background Mixture Models for Real-Time Tracking," Proceedings of the IEEE Computer Society Conference on Computer Vision and Pattern Recognition, vol. 2. pp. 246-252 (Jun. 1999).
F. Almiaro et al.,"Designing Decision and Collaboration Support Technology for Operators in Multi-UAV Operations Teams," prepared for Boeing, Phantom Works, presented by HAL at MIT (Jul. 2007).
F. Chaumette et al., "Visual Servo Control, Part II: Advanced Approaches," IEEE Robotics and Automation Magazine, vol. 14. No. 1. pp. 109-118 (Mar. 2007).
G. Rosman et al., "Coresets for k-Segmentation of Streaming Data," Advances in Neural Information Processing Systems 27, pp. 559-567 (Dec. 2014).
H. Bay et al., "Speeded Up Robust Features (SURF)," Computer Vision and Image Understanding, vol. 110. No. 3, pp. 346-359 (Sep. 2007).
I. Tsochantaridis et al., "Large Margin Methods for Structured and Interdependent Output Variables," Journal of Machine Learning Research, vol. 6, pp. 1453-1484 (Sep. 2005).
J. Johnson, "Analysis of image forming systems," Image Intensifier Symposium, AD 220160 (Warfare Electrical Engineering Department, U.S. Army Research and Development Laboratories, Ft. Belvoir, Va.), pp. 244-273 (Oct. 1958).
J. Pestana et al., "Vision based GPS-denied object tracking and following for UAV," IEEE Symposium on Safety, Security and Rescue Robotics (Oct. 2013).
L. Geng et al., "UAV Surveillance Mission Planning with Gimbaled Sensors," IEEE Intl. Conf on Control and Automation (Jun. 2014).
Lockheed Martin, OnPoint Vision Systems. Retrieved online at: <https://www.lockheedmartin.com/us/products/procerus/onpoint.html>. 1 page (2017).
M. Kristan et al., "The Visual Object Tracking VOT2013 Challenge Results," IEEE Workshop on Visual Object Tracking Challenge, pp. 98-111 (Dec. 2013).
M. Ozuysal et al., "Pose Estimation for Category Specific Multiview Object Localization." in Conference on Computer Vision and Pattern Recognition, Miami, FL (Jan. 2009).
NVIDIA, "NVIDIA Jetson TK1 Development Kit: Bringing GPU-accelerated computing to embedded systems," Technical Brief (Apr. 2014).
P.C. Niedfeldt et al., "Enhanced UAS Surveillance Using a Video Utility Metric," Unmanned Systems, vol. 1, pp. 277-296 (Sep. 2013).
P.F. Felzenszwalb et al., "Object Detection with Discriminatively Trained Part-Based Models." IEEE Transactions on Pattern Analysis and Machine Intelligence, vol. 32. No. 9. pp. 1621-1645 (Sep. 2010).
Q. Le., "Active Perception: Interactive Manipulation for Improving Object Detection." Technical Report, Stanford University (2010).
R. Bajcsy, "Active Perception," Proceedings of the IEEE, vol. 76. No. 8, pp. 966-1005 (Mar. 1988).
R. Higgins, "Automatic event recognition for enhanced situational awareness in UAV video." Military Communications Conference, 2005. MILCOM 2005. IEEE, vol. 3, pp. 1706-1711 (Oct. 2005).
S. Hare et al., "STRUCK: Structured Output Tracking with Kernels," Proceedings of the 2011 IEEE International Conference on Computer Vision, pp. 263-270 (Oct. 2011).

* cited by examiner

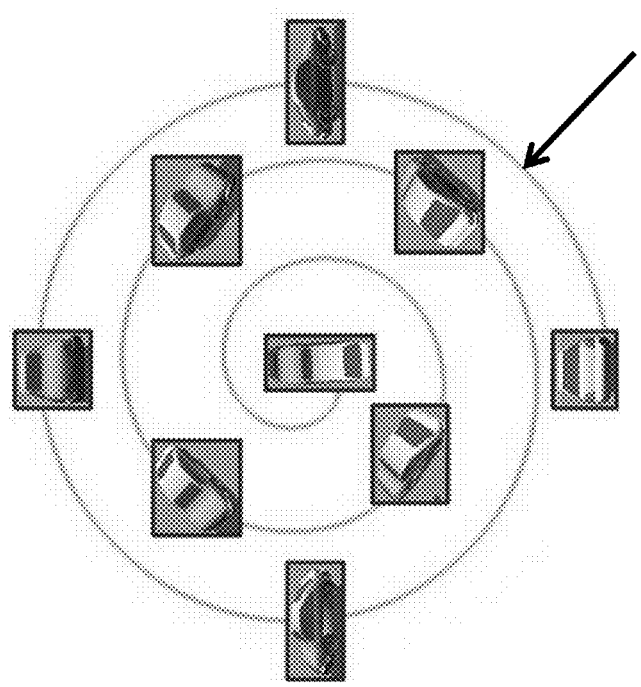
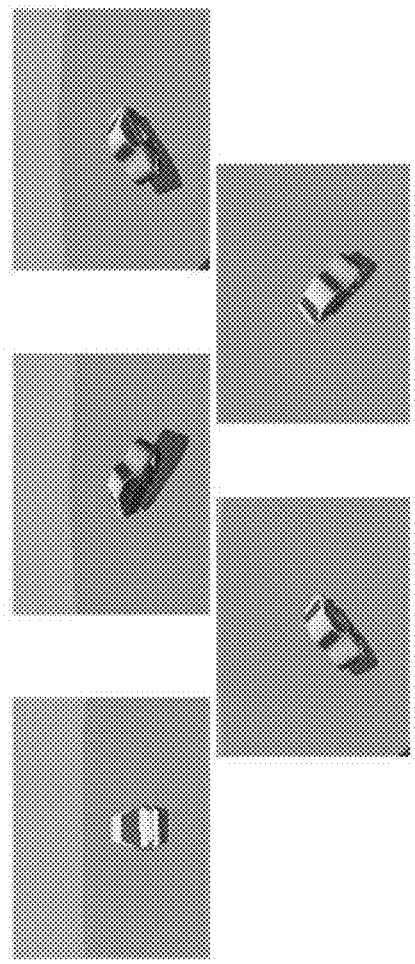
FIG. 18B
FIG. 18A

SYSTEMS AND METHODS FOR DYNAMIC PLANNING AND OPERATION OF AUTONOMOUS SYSTEMS USING IMAGE OBSERVATION AND INFORMATION THEORY

RELATED APPLICATION

This application claims priority to U.S. Provisional Application No. 62/322,901, filed Apr. 15, 2016, the entire contents of which is incorporated herein by reference.

STATEMENT OF GOVERNMENT SUPPORT

This invention was made with Government support under Contract No. FA8721-05-C-0002 awarded by the U.S. Air Force. The Government has certain rights in the invention.

BACKGROUND

Remotely-piloted small UAVs (sUAVs) are increasingly used in both military and civilian applications. Since they are generally quite maneuverable, can be launched without runways, and can provide close-in sensing capabilities at low altitudes including possibly indoor environments, they can fill a surveillance mission gap not met by higher-flying UAVs such as predators or global hawks. Furthermore, since they cost much less to manufacture (in the order of thousands of dollars), they are more readily replaceable in the event of crashes during a mission.

In addition to surveillance applications, sUAVs can be great assets to have for other types of operations as well such as area search, aerial mapping, or payload delivery. Examples include supporting search and rescue operations in the aftermath of a disaster, performing aerial survey to provide the most up-to-date battlefield situation awareness at a tactical level, or delivering medicine or supplies to warfighters and the wounded.

BRIEF DESCRIPTION OF DRAWINGS

The patent or application file contains at least one drawing executed in color. Copies of this patent or patent application publication with color drawings will be provided by the Office upon request and payment of the necessary fee.

The skilled artisan will understand that the drawings are primarily for illustrative purposes and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar or structurally similar elements).

Figure 1:
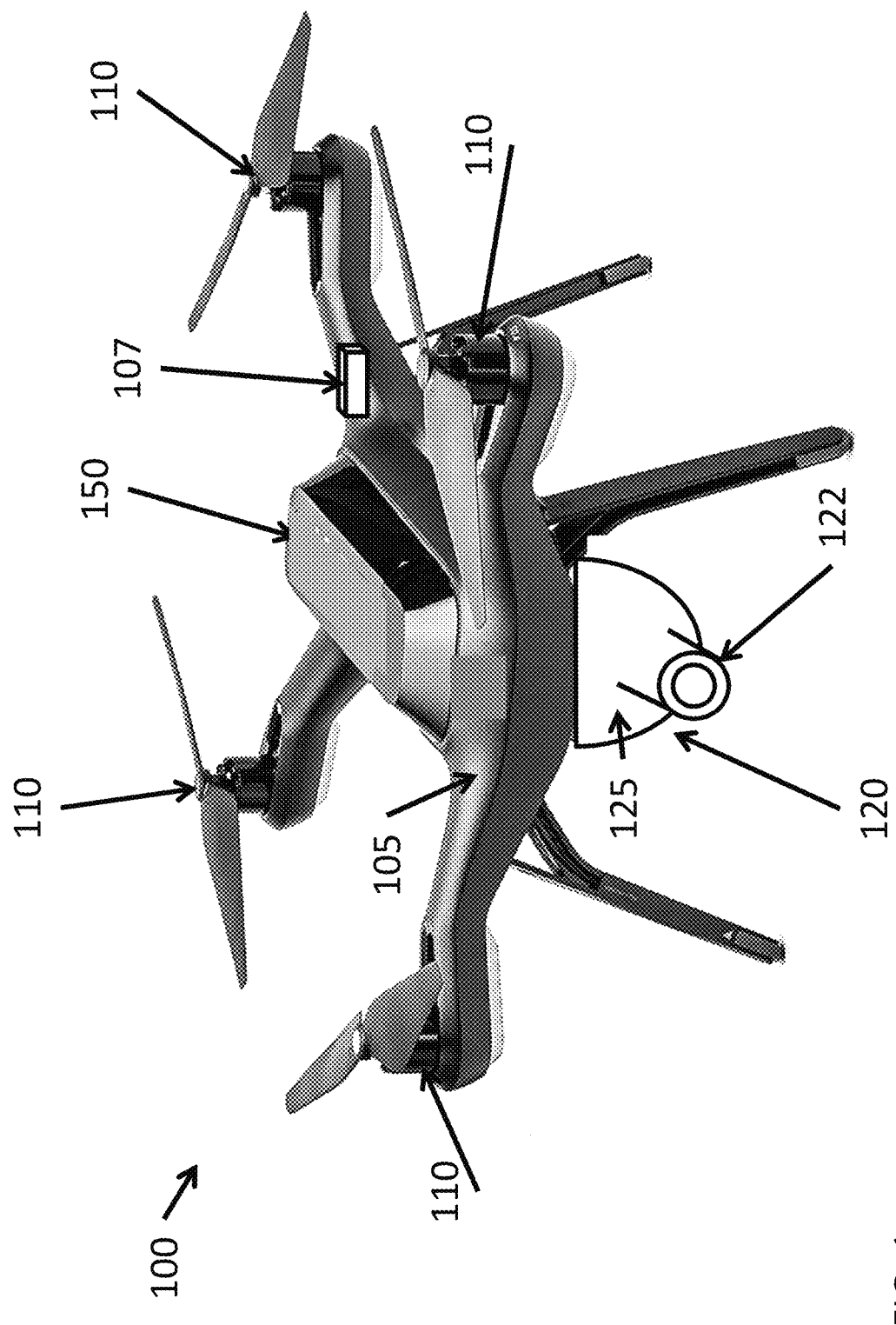
Figure 2:
Figure 3:
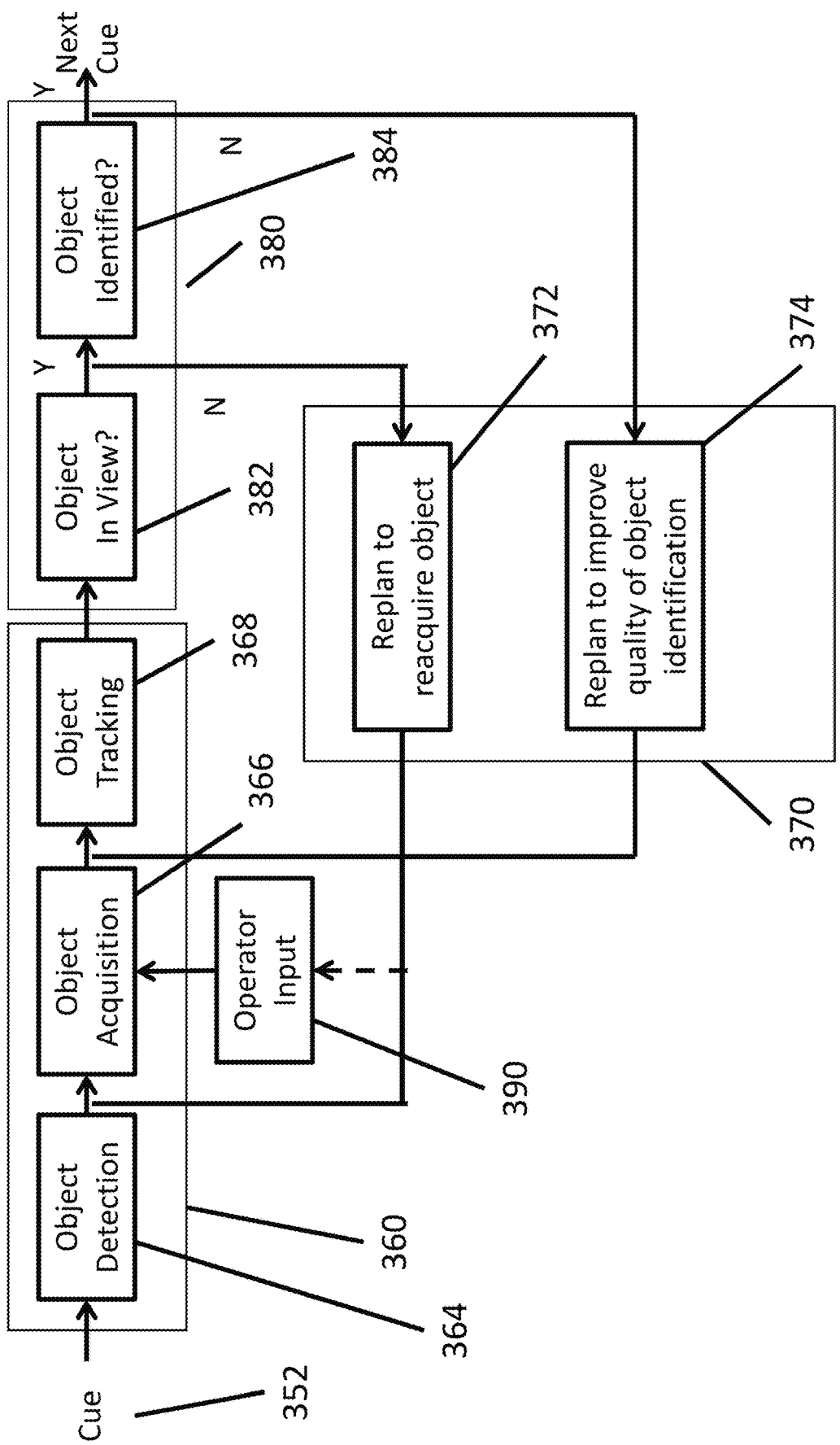
Figure 4:
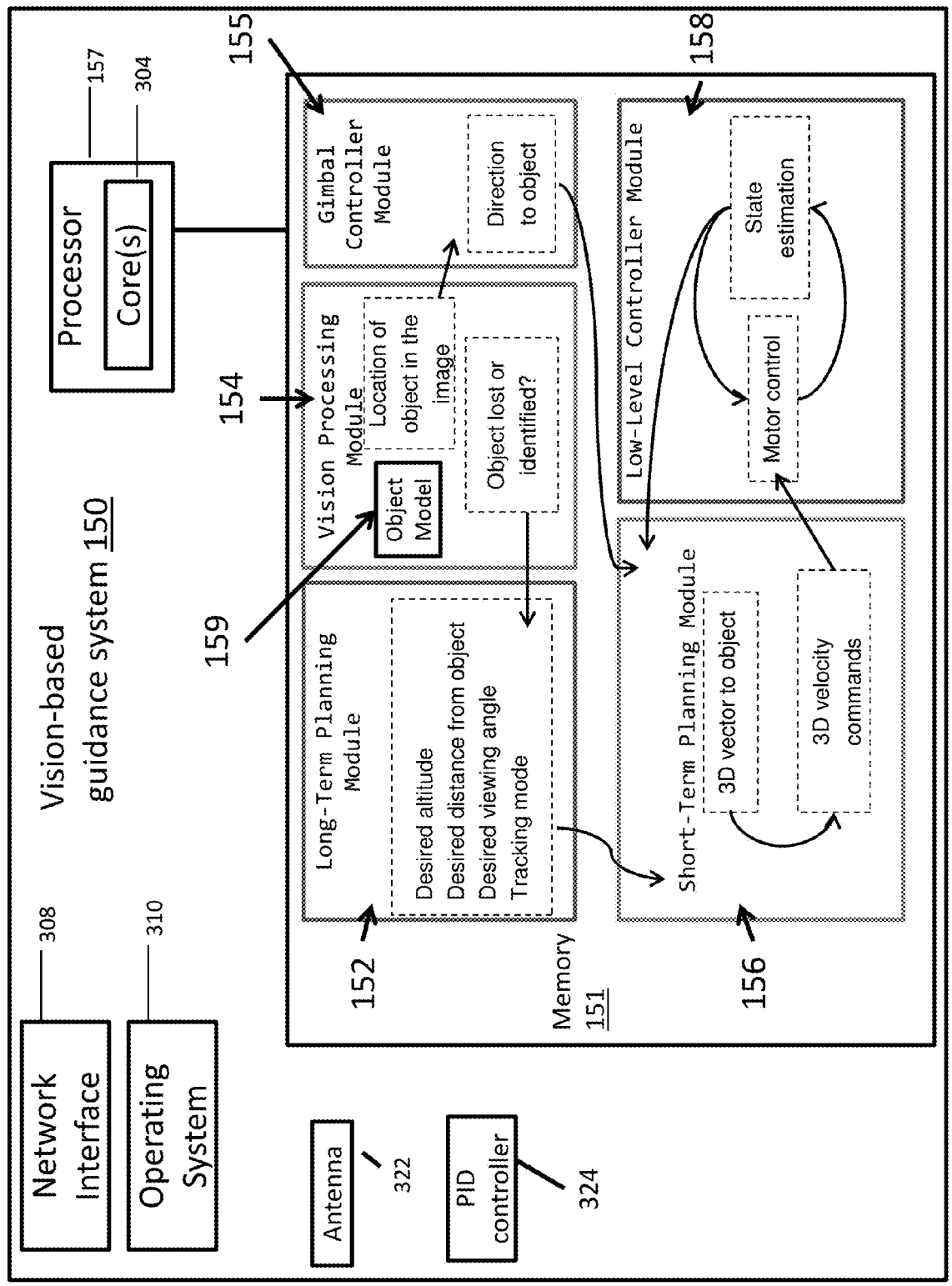
Figure 5:
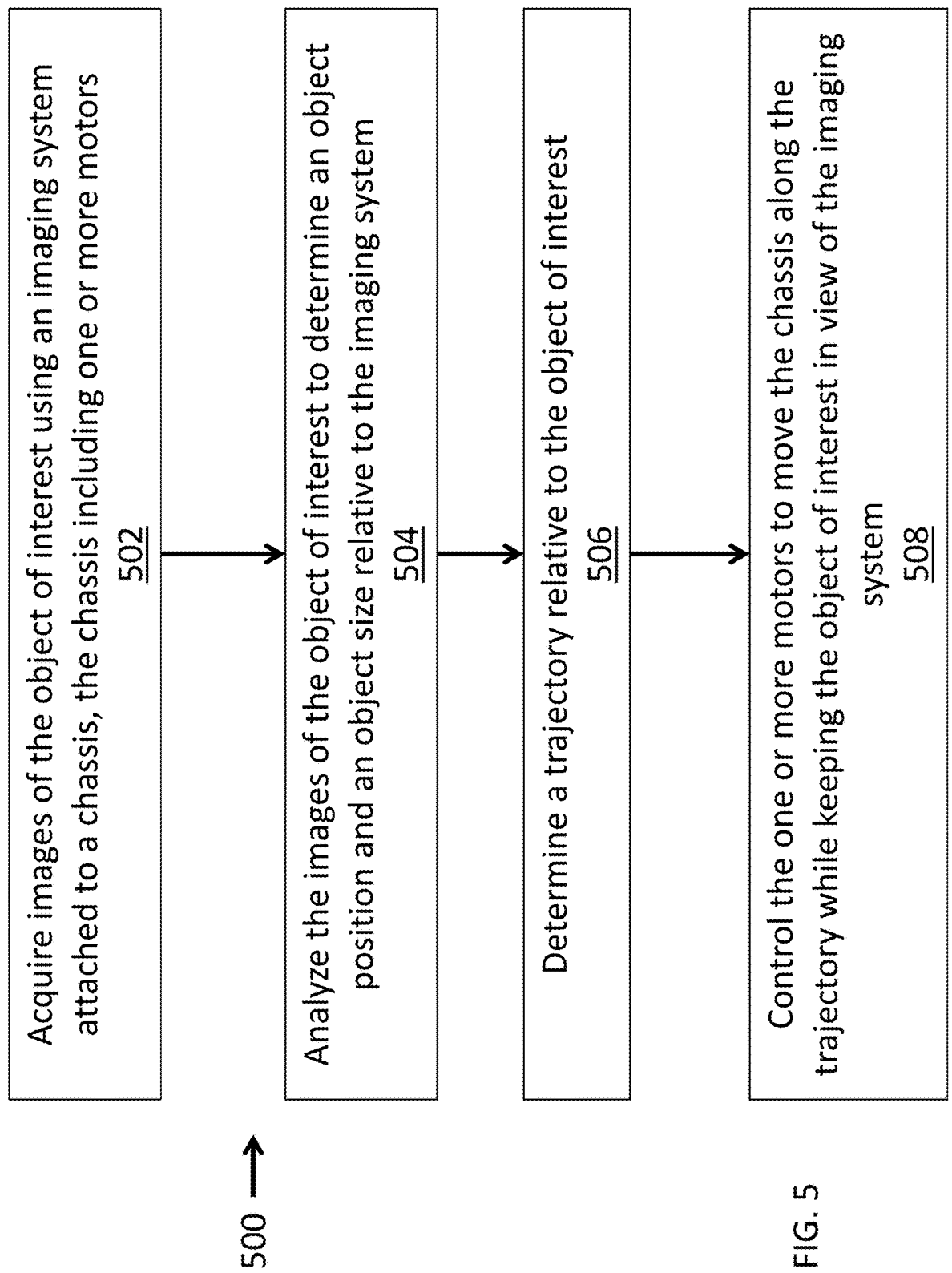

The foregoing and other features and advantages provided by the present disclosure will be more fully understood from the following description of exemplary embodiments when read together with the accompanying drawings, in which:

FIG. 1 illustrates an autonomous system in accordance with various embodiments described herein;

FIG. 2 illustrates a concept of operations for systems and methods described herein;

FIG. 3 illustrates a high-level processing and control architecture for implementing systems and methods described herein;

FIG. 4 illustrates an example onboard sUAV vision-based guidance system in accordance with embodiments described herein;

FIG. 5 illustrates a flowchart for a method of autonomously tracking an object of interest in accordance with various embodiments described herein.

Figure 6A:
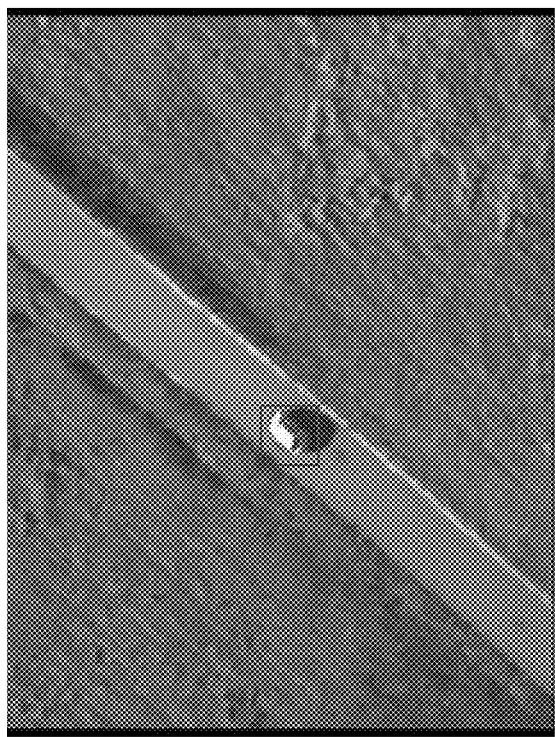
Figure 6C:
Figure 6B:
Figure 6F:
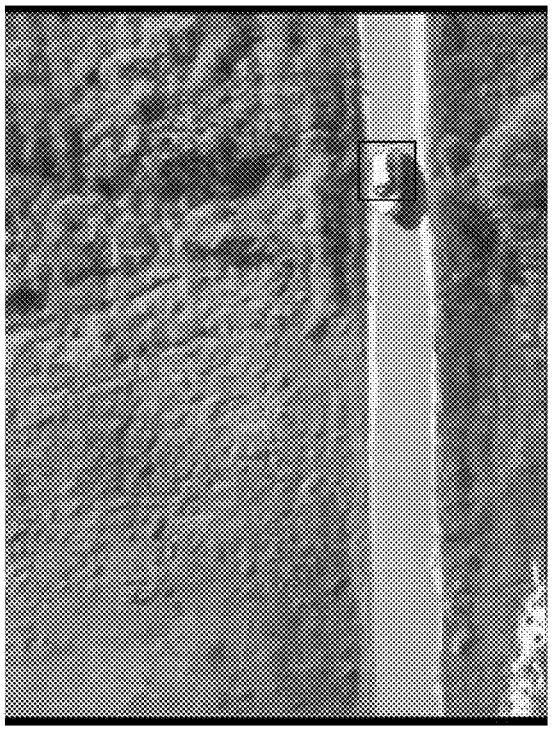
Figure 6D:
Figure 6E:
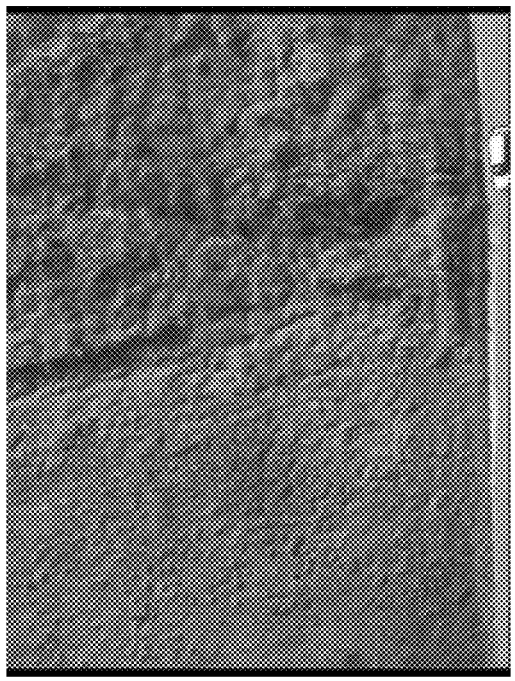
Figure 7A:
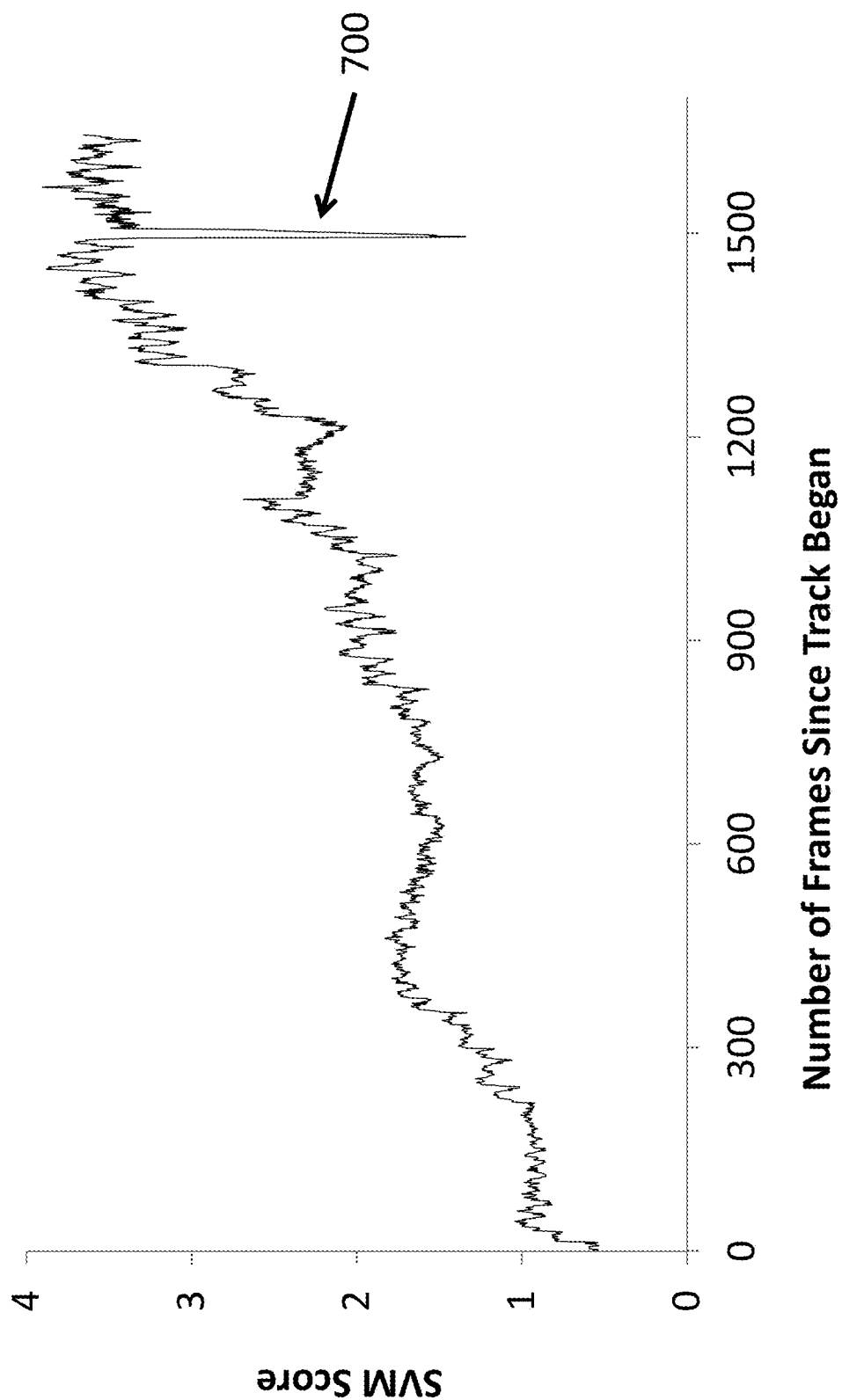
Figure 7B:
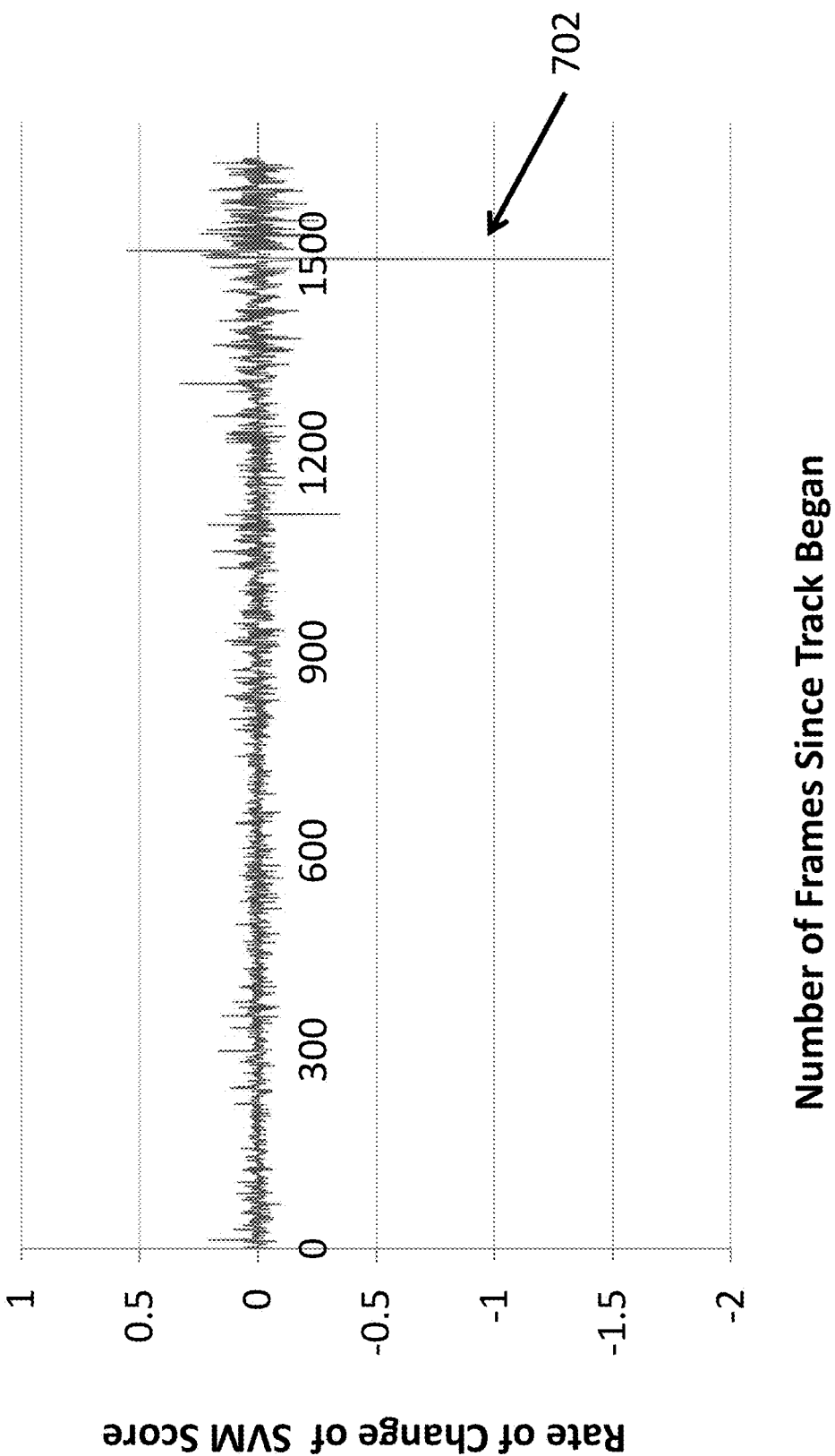
Figure 8A:
Figure 8B:
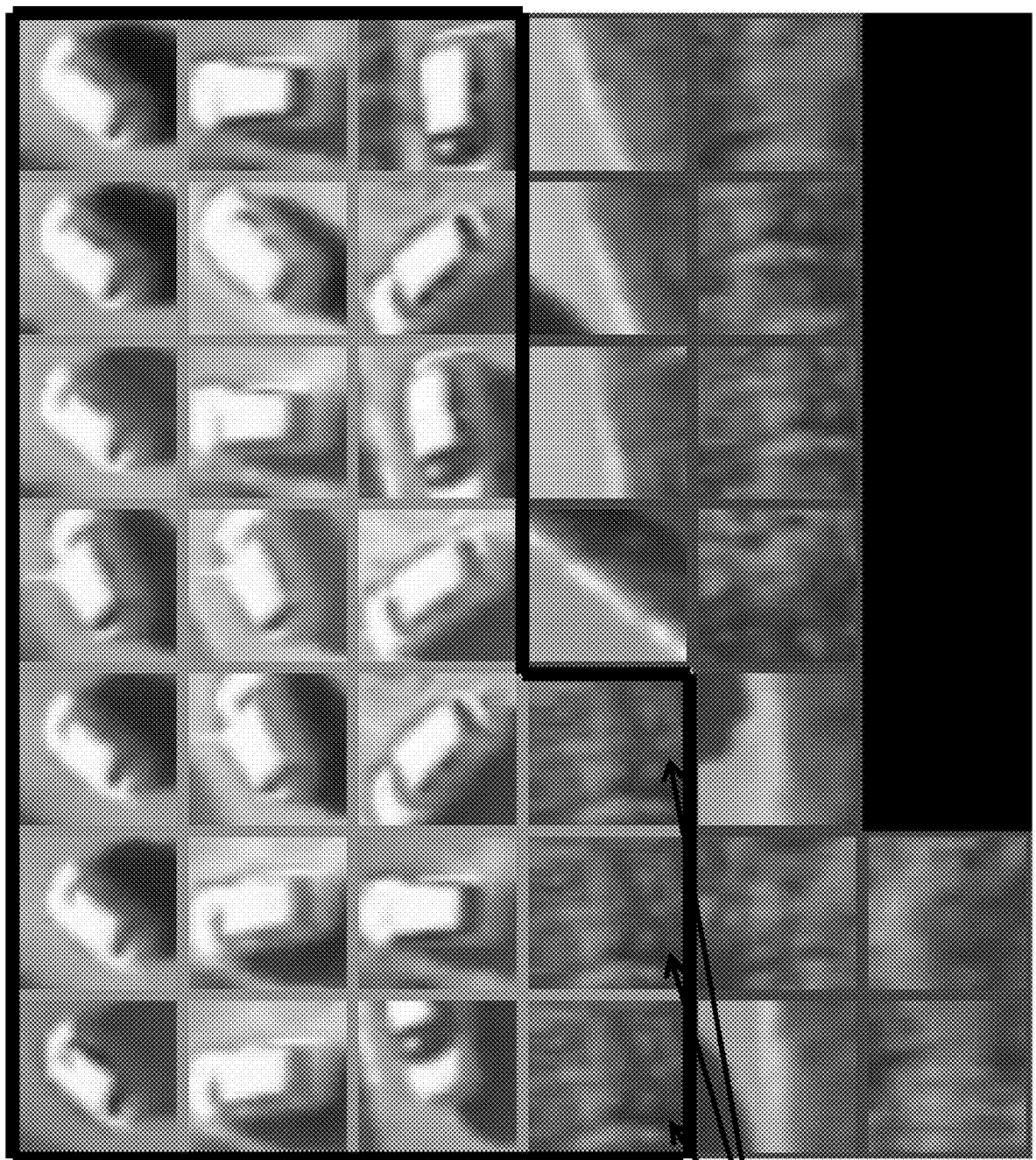
Figure 8C:
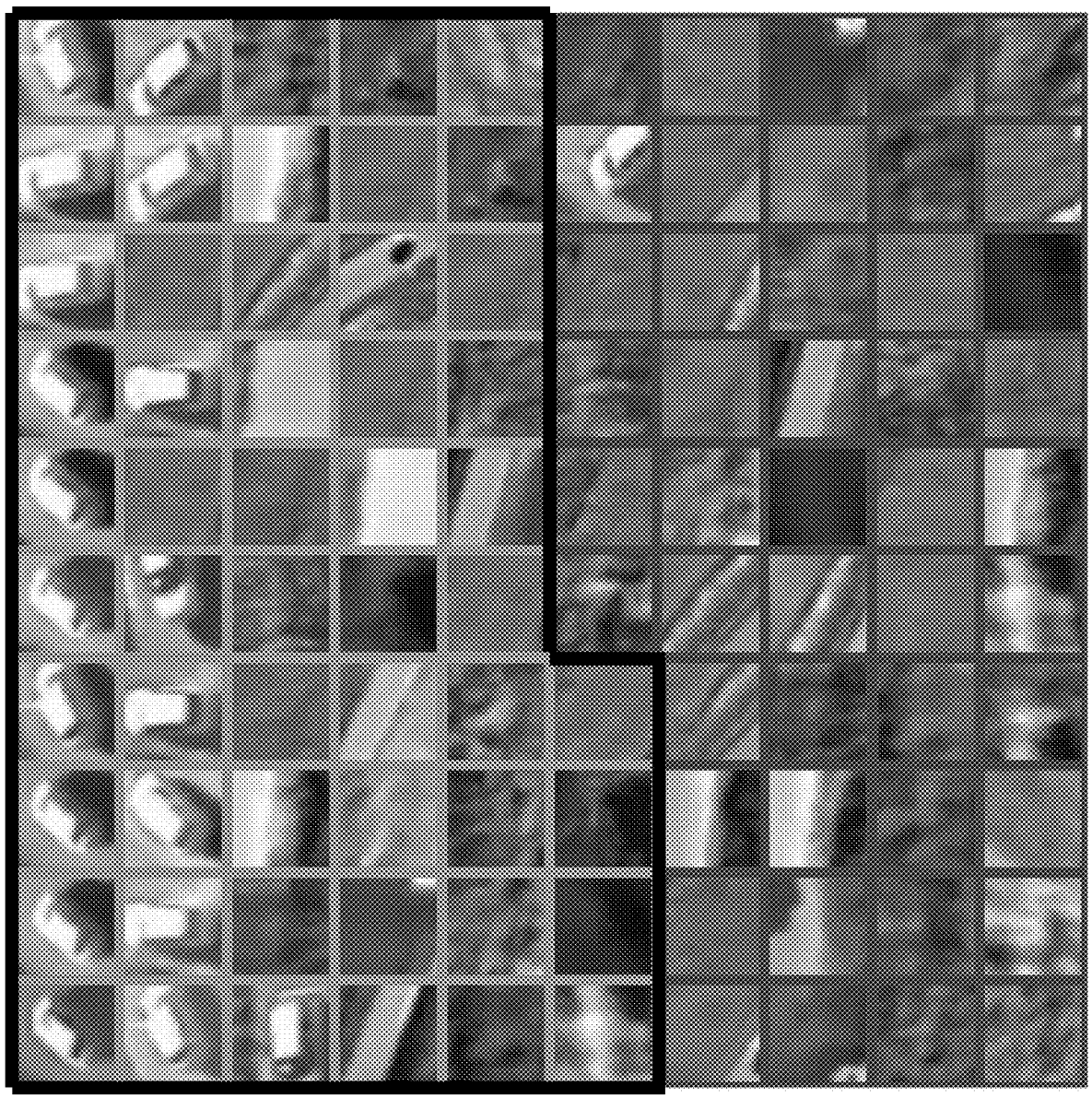
Figure 9:
Figure 10:
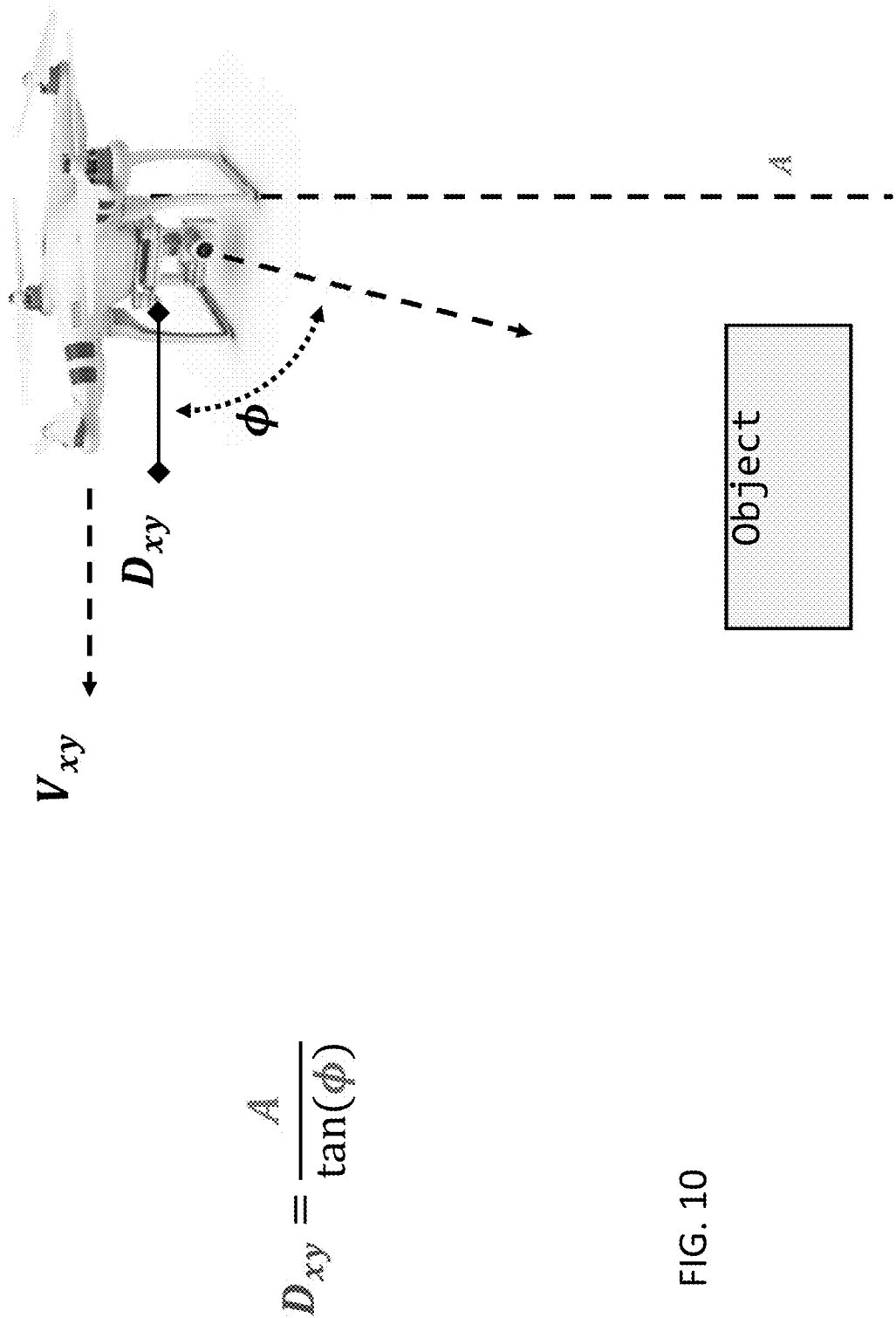
Figure 11:
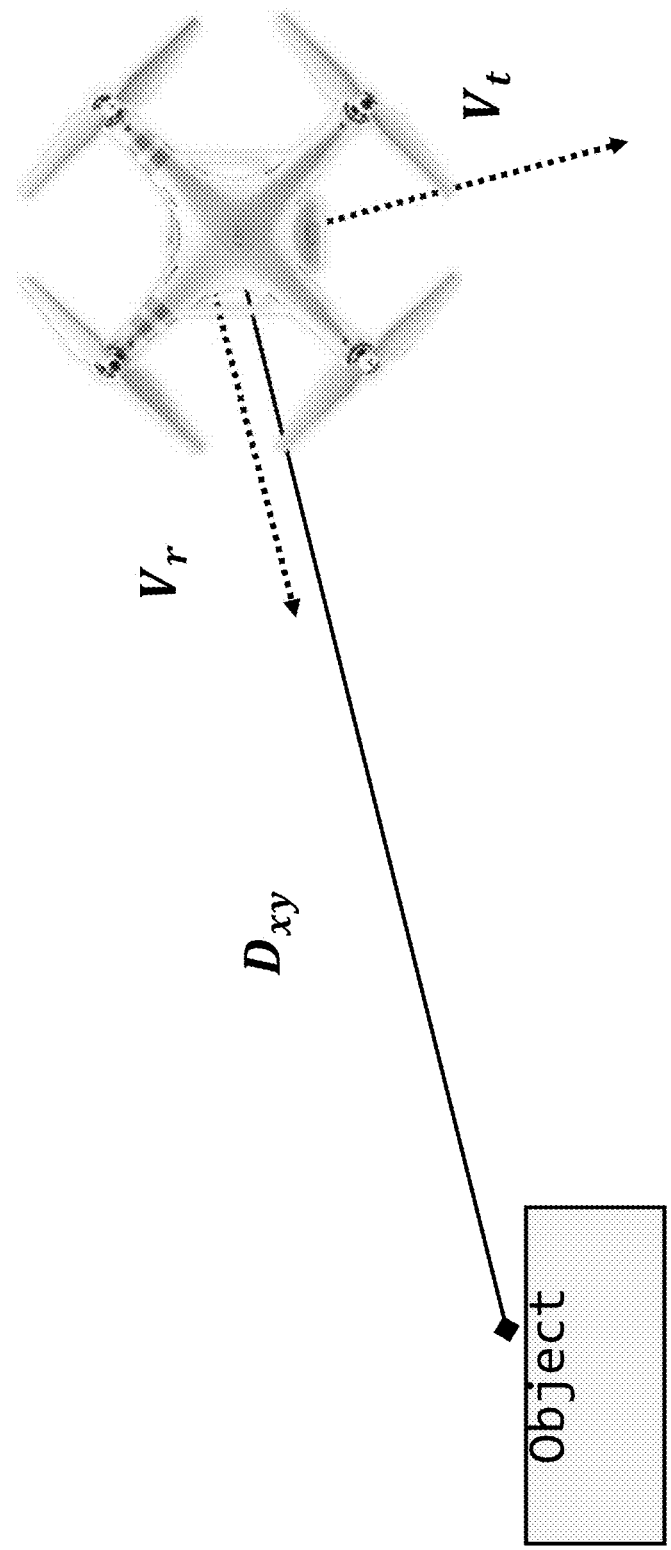
Figure 12:
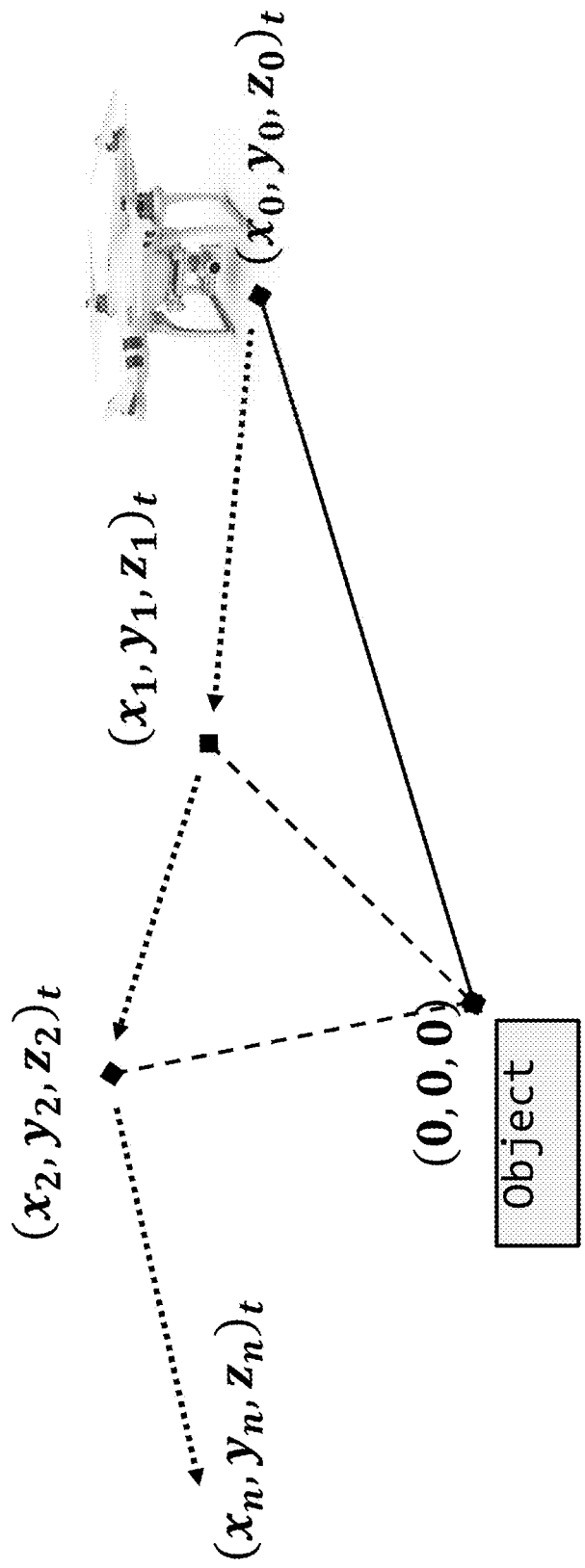
Figure 13:
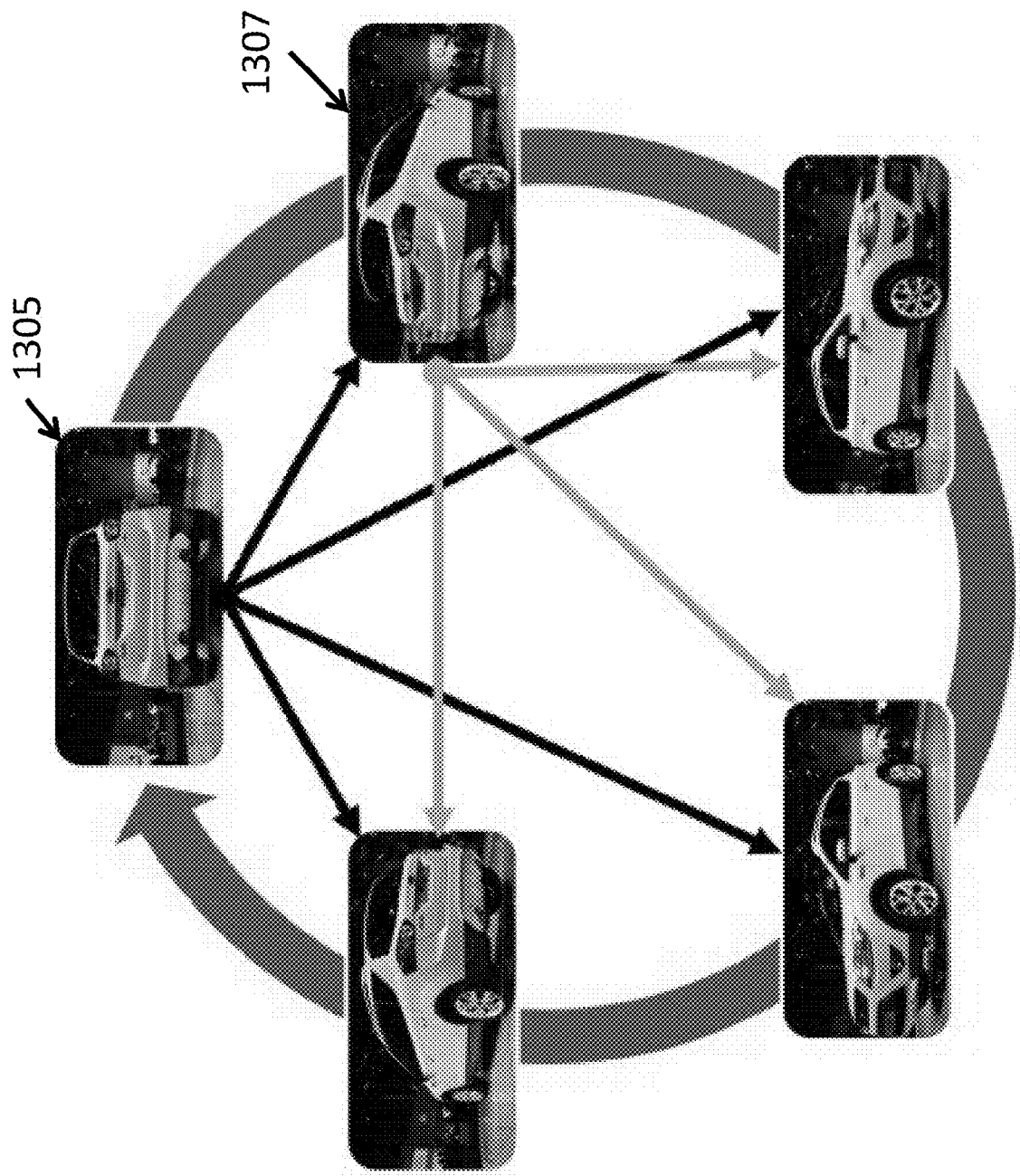
Figure 14:
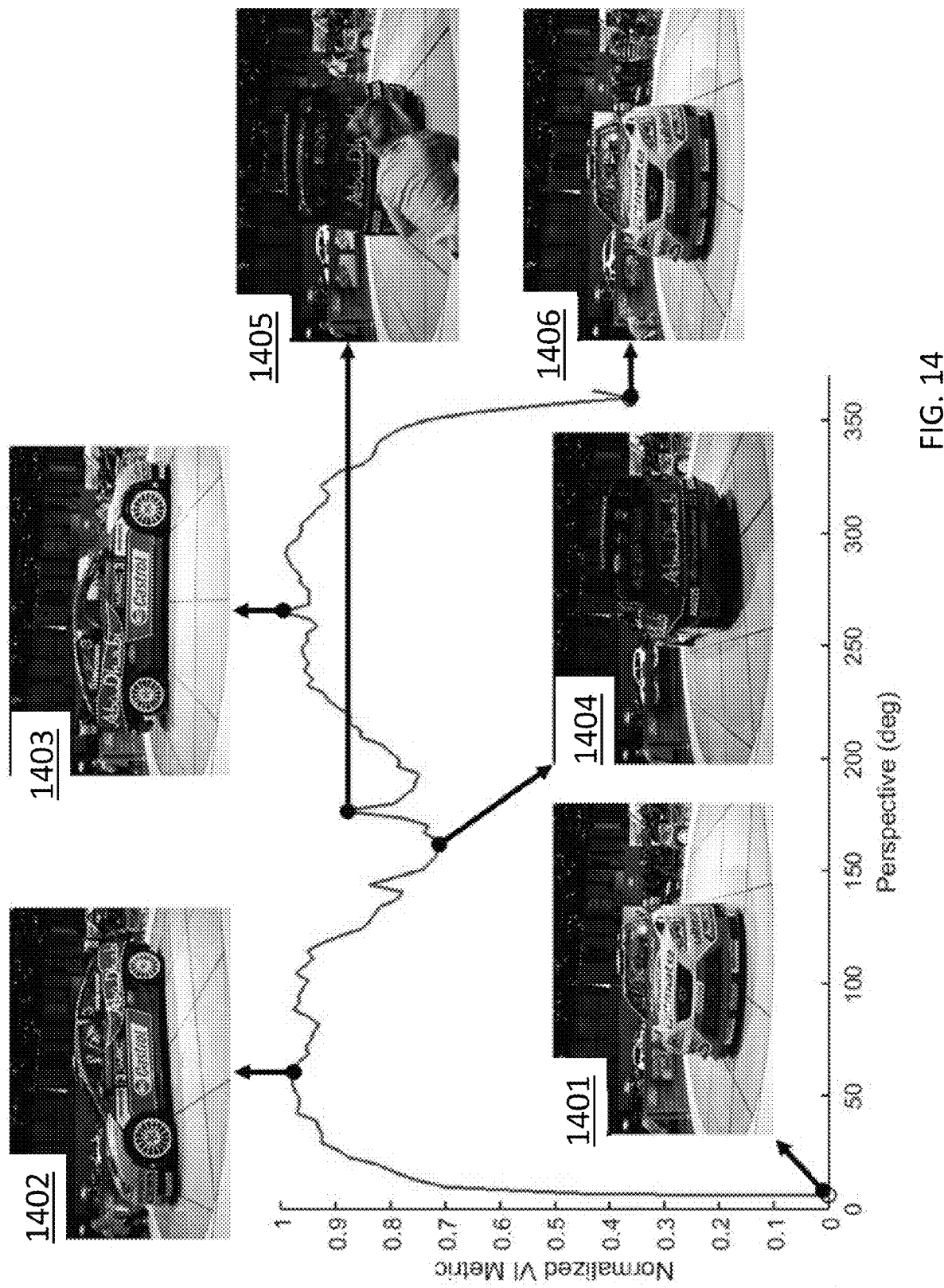
Figure 15:
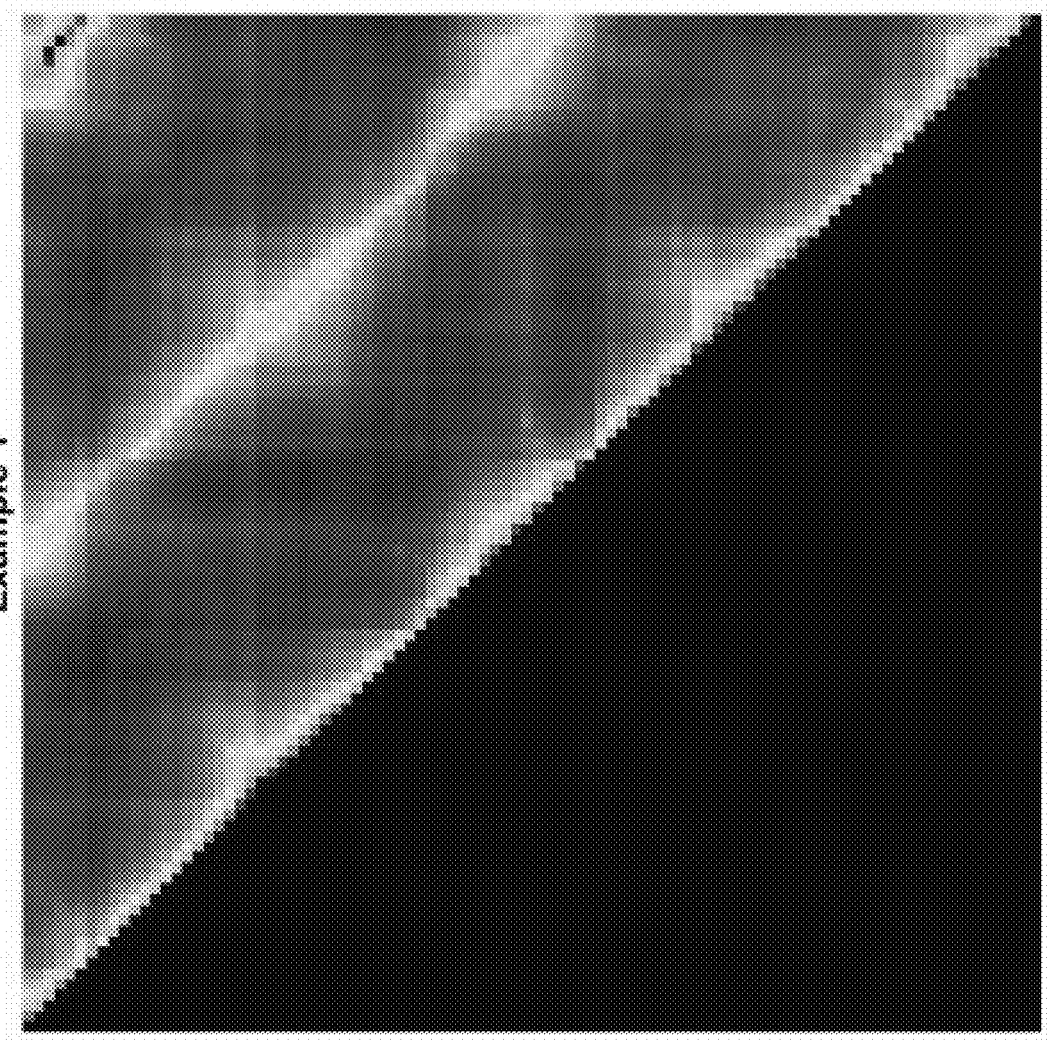
Figure 16:
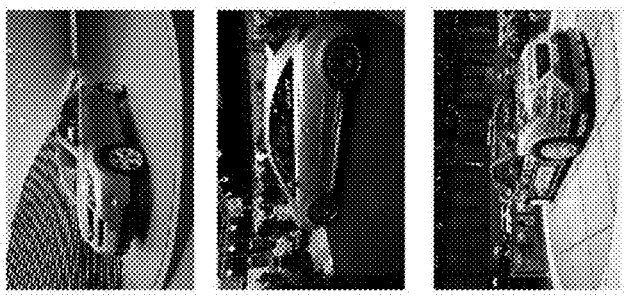
Figure 16:
Figure 16:
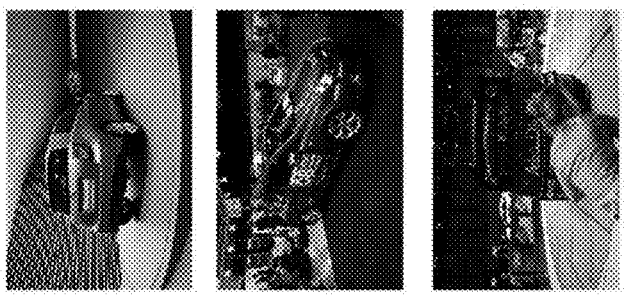
Figure 16:
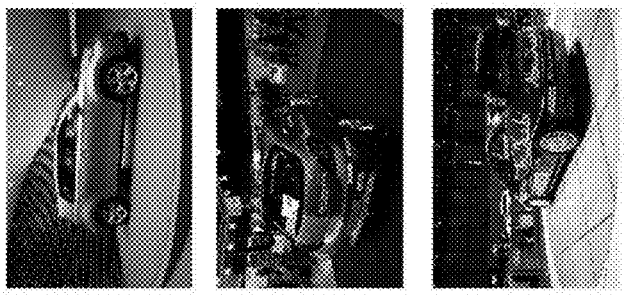
Figure 16:
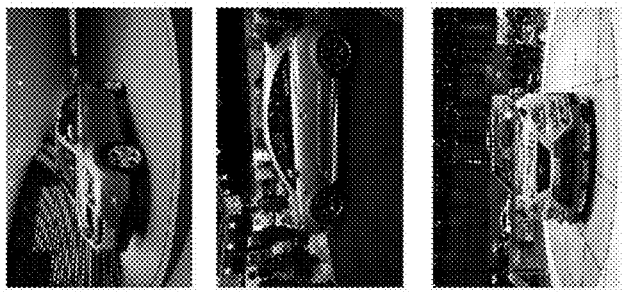
Figure 17A:
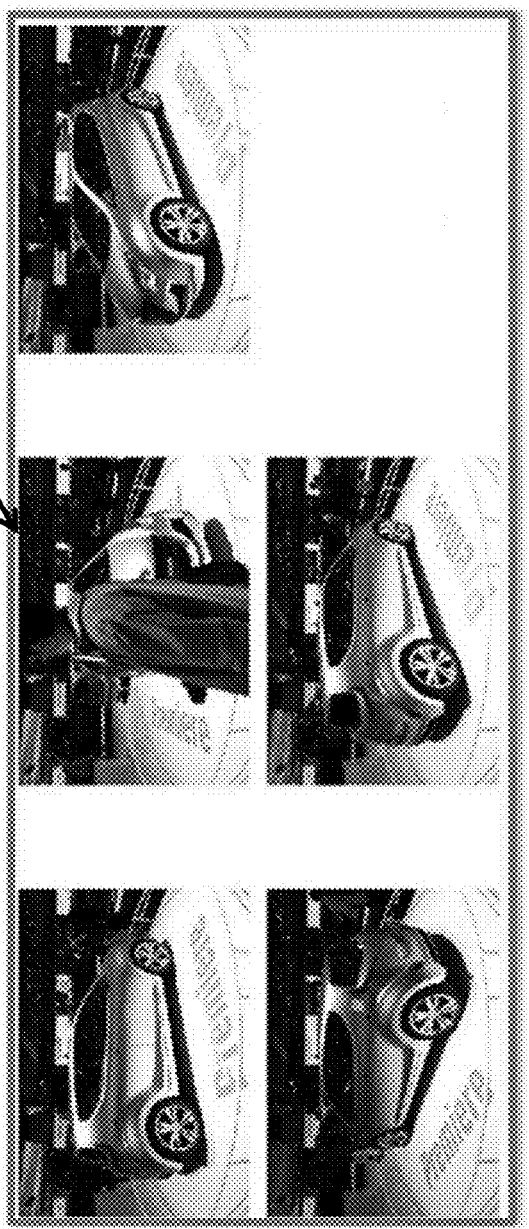
Figure 17B:
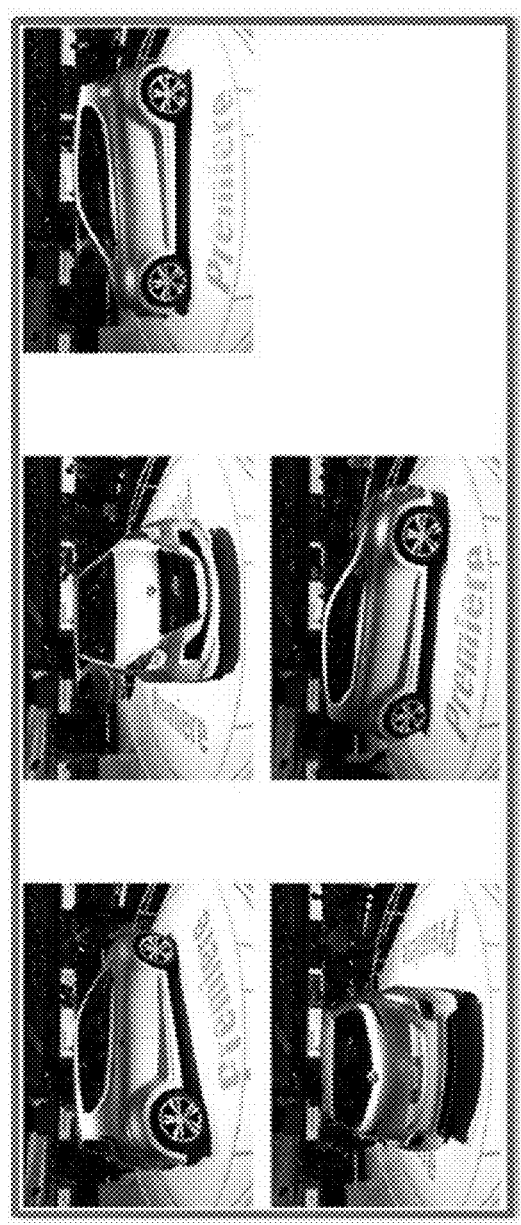
Figure 19:
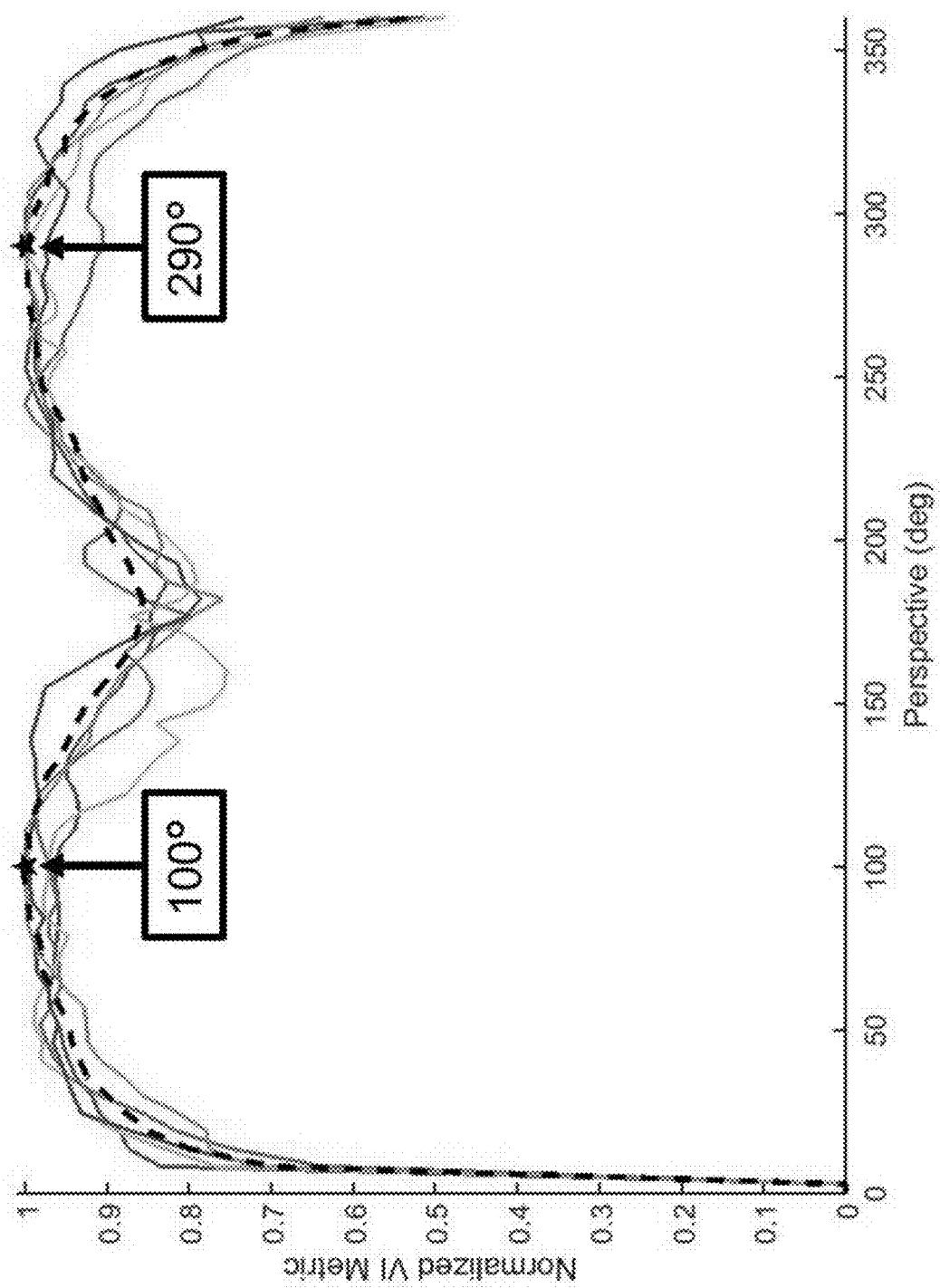
Figure 20:
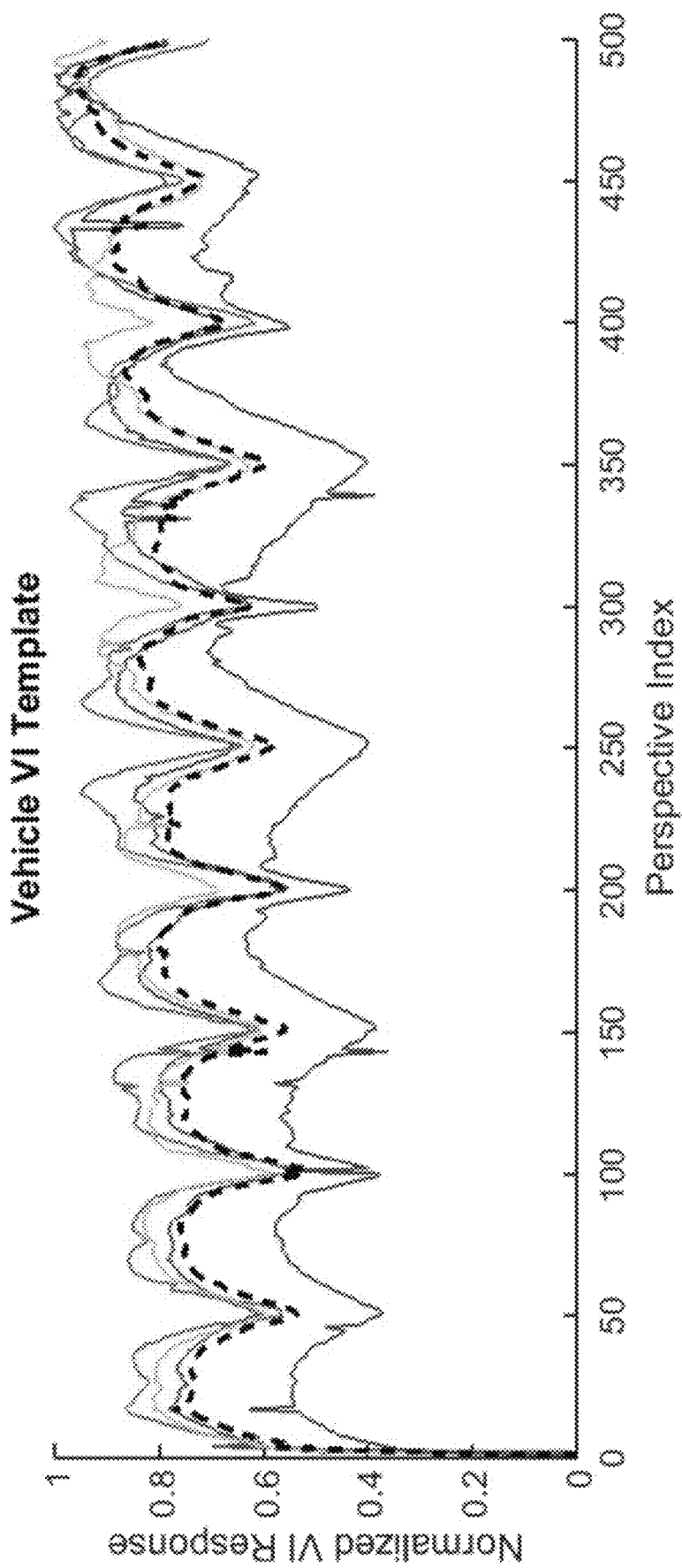
Figure 21:
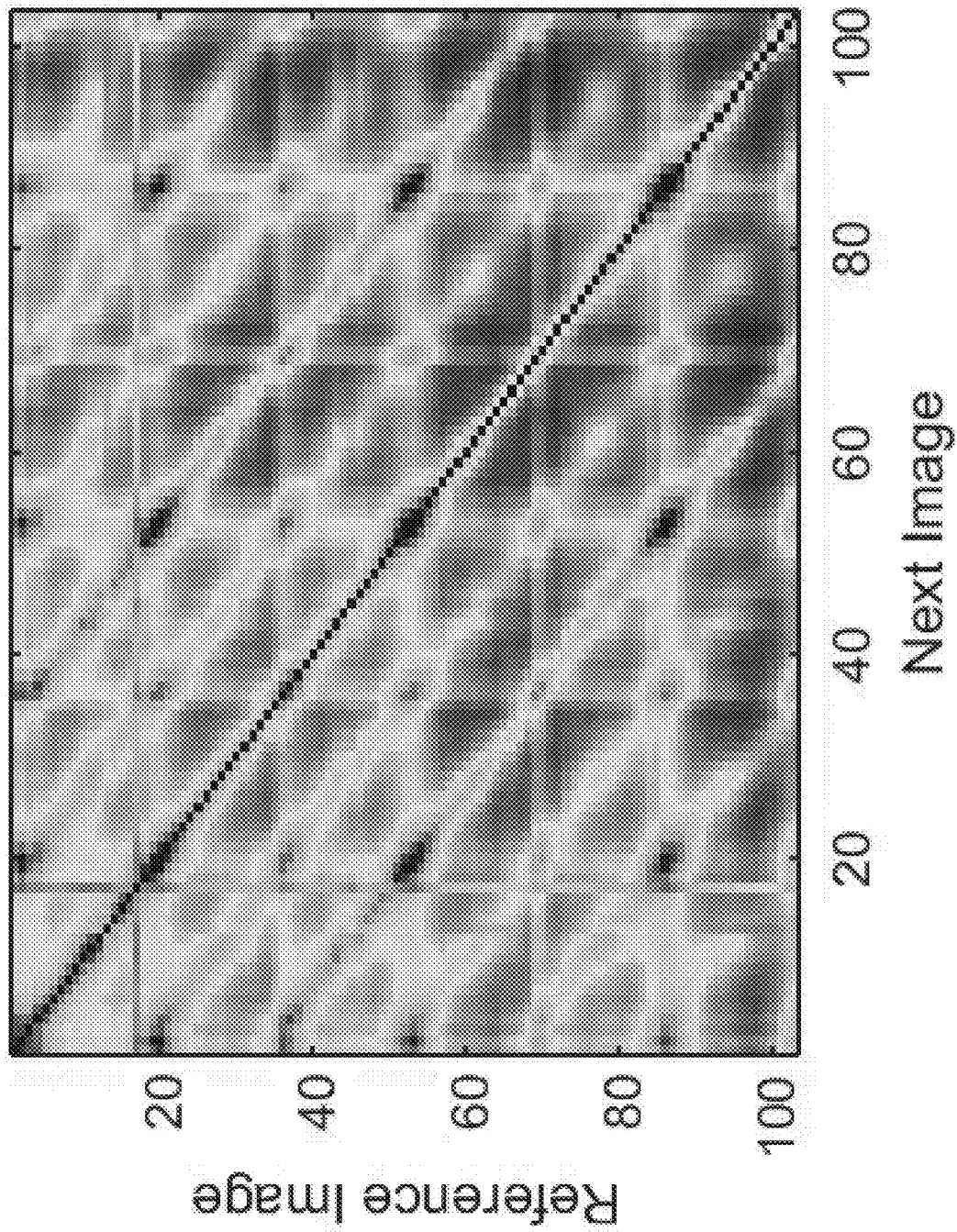
Figure 22A:
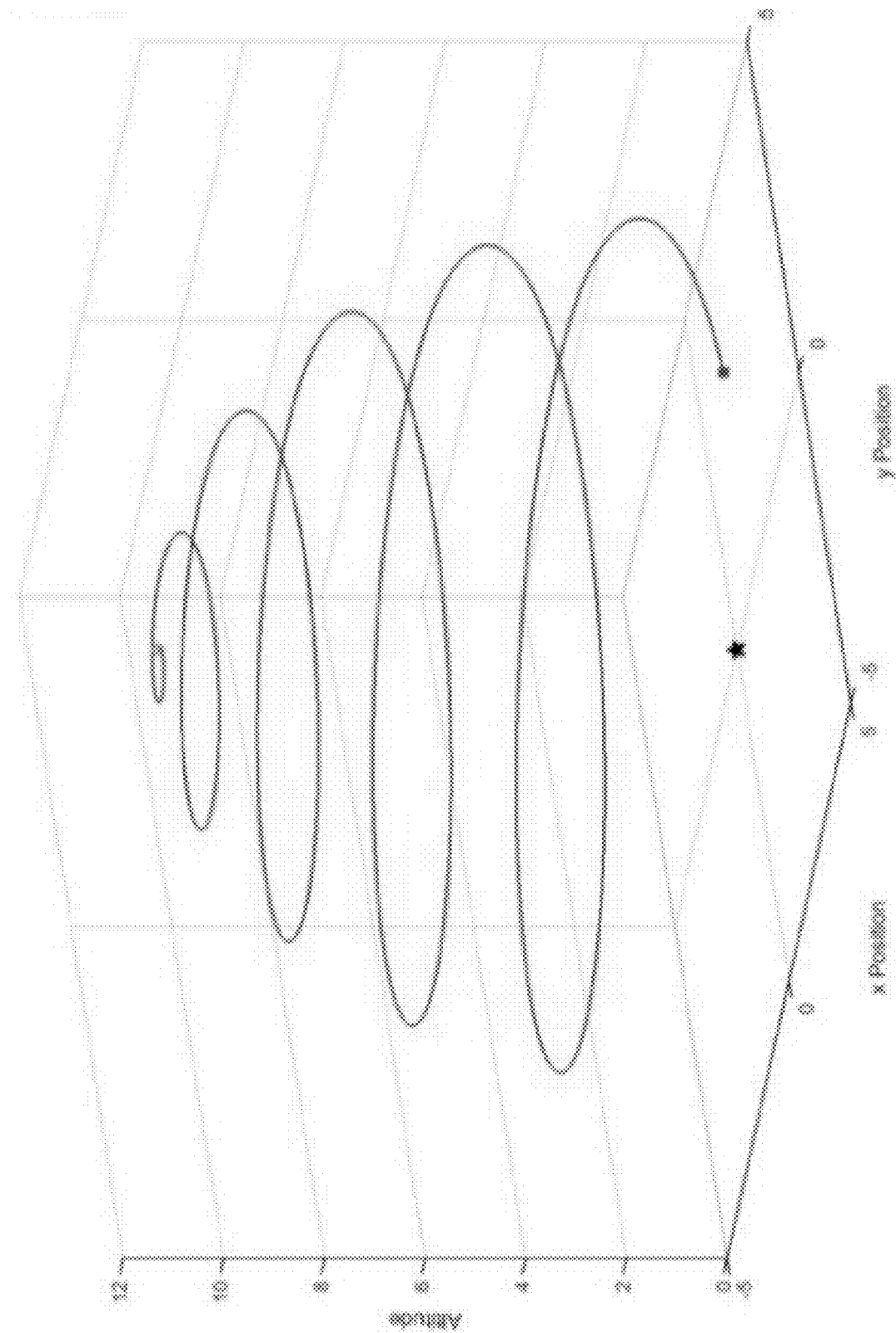
Figure 22B:
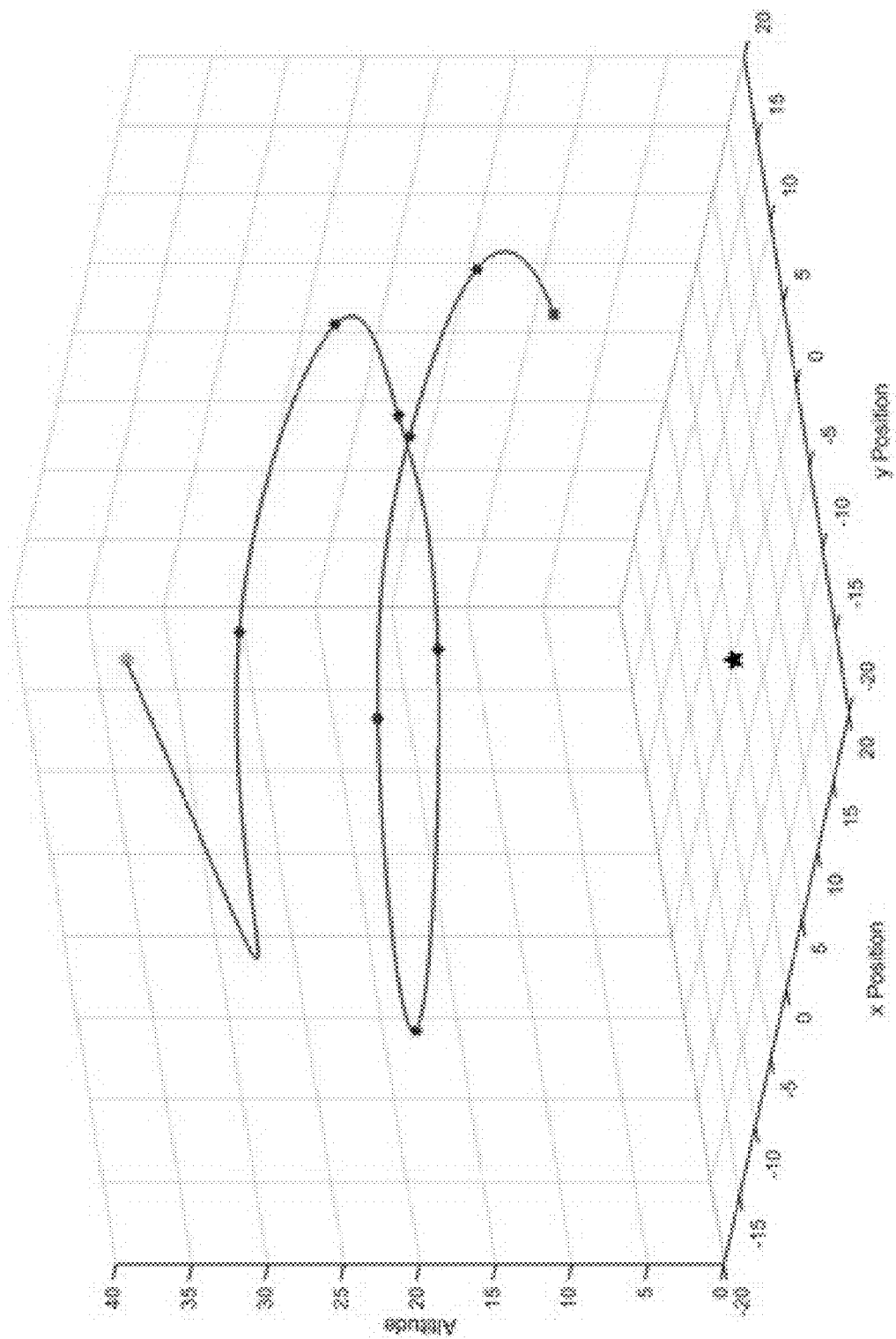
Figure 22C:
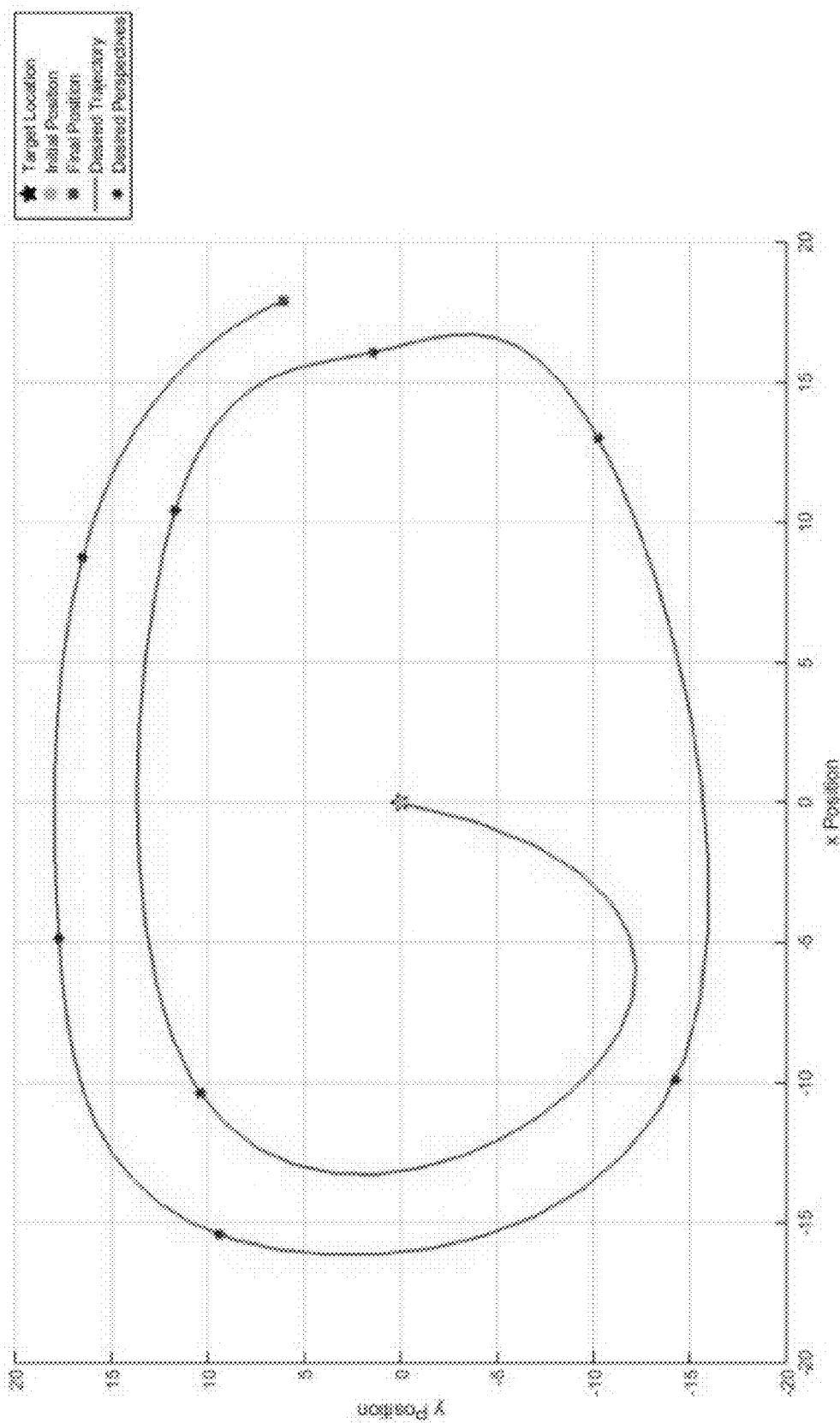
Figure 23:
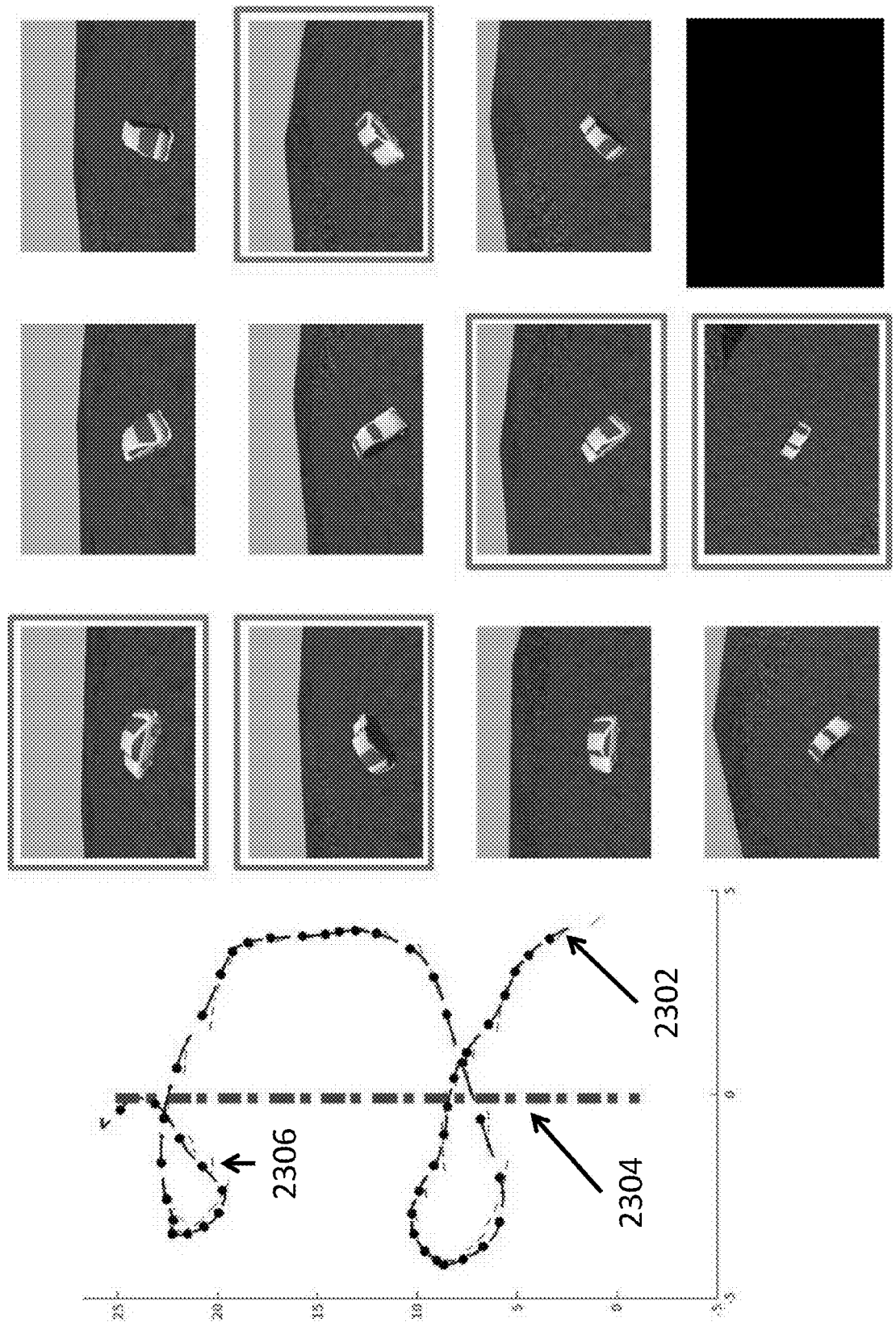
Figure 24A:
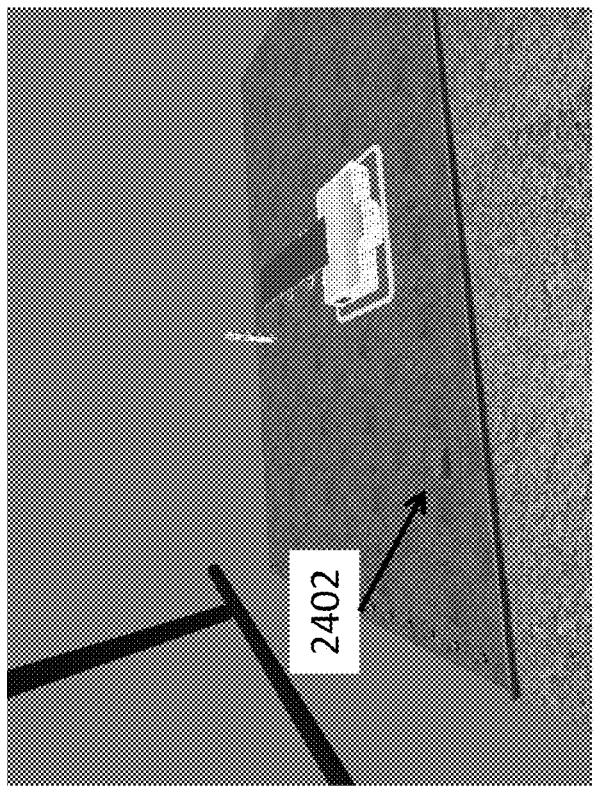
Figure 24B:
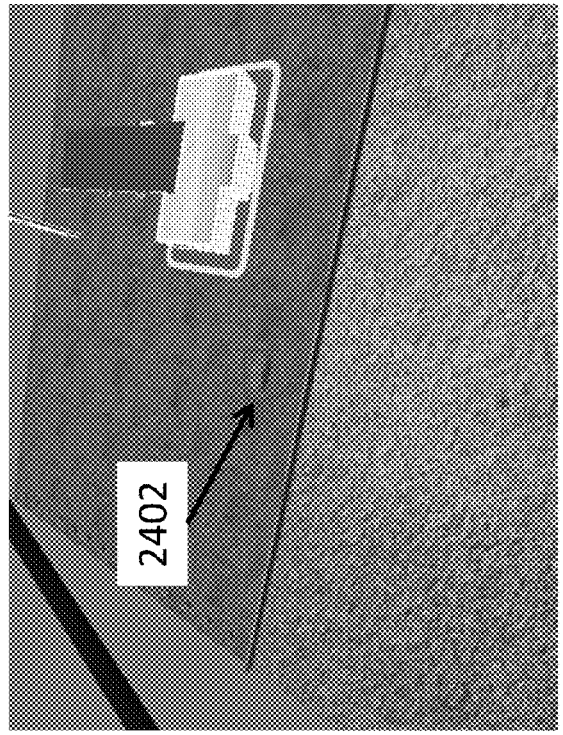
Figure 24C:
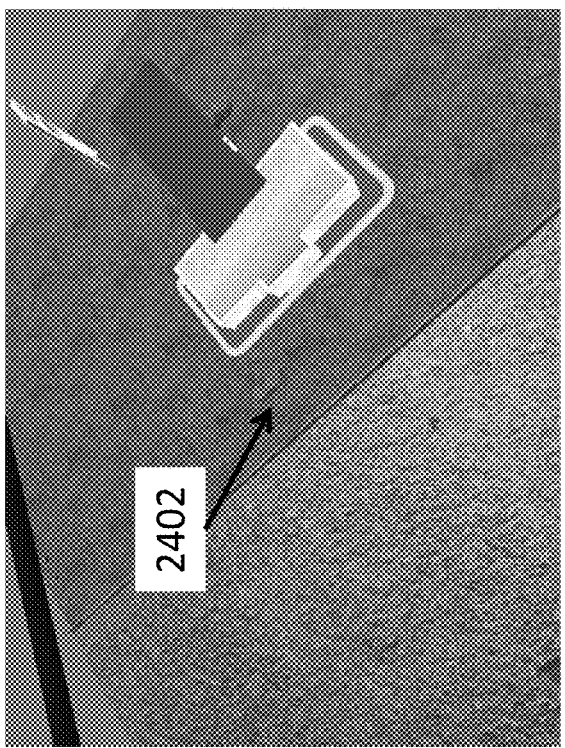
Figure 24E:
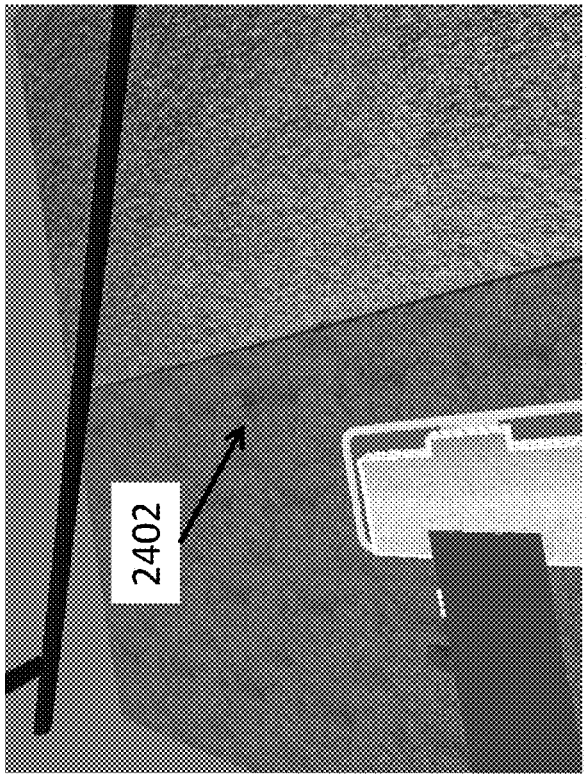
Figure 24D:
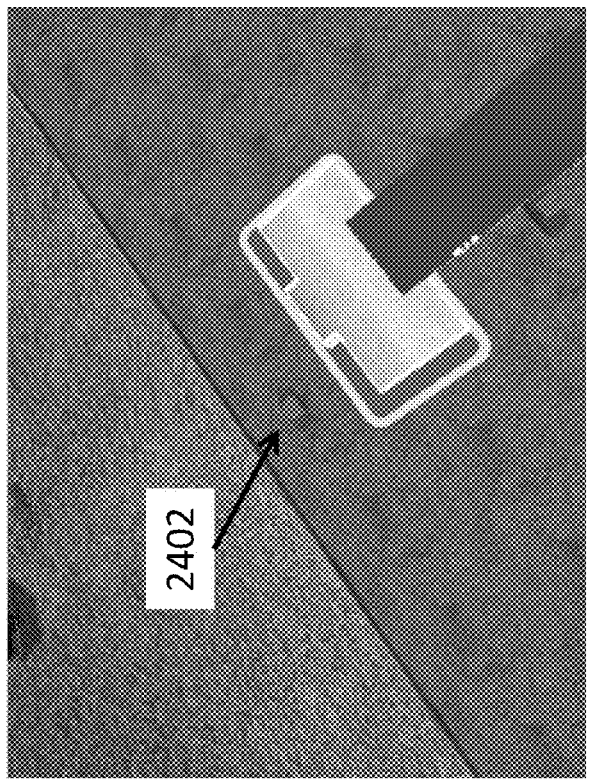
Figure 24F:
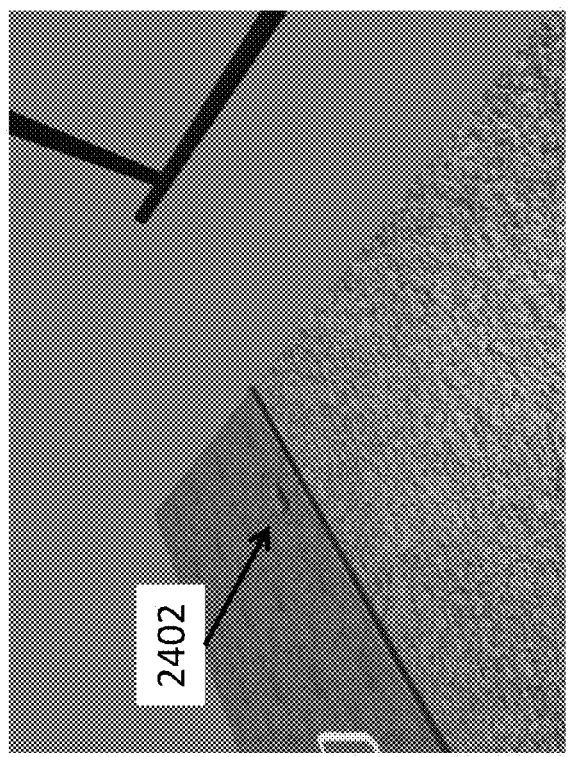

FIGS. 6A-6F illustrate visual examples of implementing a tracking algorithm using a vision processing module in accordance with embodiments of the present disclosure;

FIG. 7A illustrates support vector machine (SVM) scores for images in the track depicted in FIGS. 6A-6F;

FIG. 7B illustrates the rate of change of the SVM scores for images depicted in the track in FIGS. 6A-6F;

FIGS. 8A-8C illustrate object models represented by positive (within thick line border) and negative support vectors updated using machine learning techniques in accordance with various embodiments of the present application;

FIG. 9 illustrates a mosaic image produced from successively acquired images adjusted using a feature-based matching algorithm in accordance with various embodiments taught herein;

FIG. 10 illustrates a system-object of interest relationship for use by a flyover controller in accordance with various embodiments taught herein;

FIG. 11 illustrates a system-object of interest relationship for use by an orbit controller in accordance with various embodiments taught herein;

FIG. 12 illustrates a generalized trajectory including relative waypoints in accordance with various embodiments taught herein;

FIG. 13 illustrates a calculation of information gain between images in a sequence for the first two images in accordance with various embodiments taught herein;

FIG. 14 illustrates a plot showing the normalized variation of information (VI) metric computed for the first image in a sequence with respect to subsequent images along with key images at points along the VI response;

FIG. 15 illustrates a VI map for an example car. The y-axis represents the image or perspective to which the following images are compared. The x-axis corresponds to the next image or perspective;

FIG. 16 illustrates three examples of the most informative images selected from a vehicle image dataset;

FIG. 17A illustrates images selected in accordance with systems and methods described herein while FIG. 17B illustrates images selected by uniform sampling;

FIG. 18A illustrates a visualization of the dataset collected using a spiral path;

FIG. 18B illustrates an exemplary set of images selected from a synthetic dataset in accordance with embodiments herein;

FIG. 19 illustrates a template for selecting waypoints from an arbitrary starting position in two dimensions in accordance with embodiments described herein;

FIG. 20 illustrates a template for selecting waypoints from an arbitrary starting position in three dimensions starting from directly above the object of interest in accordance with embodiments described herein;

FIG. 21 illustrates a template of a VI map to generate a lookup table in accordance with embodiments described herein;

FIG. 22A illustrates an example of a pre-determined spiral path;

FIGS. 22B and 22C illustrate perspective and top view, respectively, of a pre-determined trajectory and path in accordance with embodiments described herein;

FIG. 23 illustrates a simulated trajectory and path produced by a control framework and images from the selected waypoints in accordance with embodiments described herein;

FIGS. 24A-24F illustrate images obtained of an object of interest in a simulated system in accordance with embodiments described herein; and

DETAILED DESCRIPTION

Systems and methods described herein incorporate autonomous navigation using a vision-based guidance system into sUAVs. The vision-based guidance system enables autonomous trajectory planning and track recovery along with motion execution by the described systems and methods without feedback or instructions from an external operator. The systems and methods described herein allow a sUAV to comply with SWaP constraints while providing the sUAV with autonomous tracking and planning abilities. That is, as taught herein once an object of interest is acquired by the sUAV, the sUAV can track the object of interest autonomously without operator input and can recover and reacquire tracking of the object of interest autonomously in the event the sUAV loses track of the object of interest. The systems and methods taught herein can autonomously track an object of interest while seeking to obtain a diversity of views of the object to aid in object identification. The systems and methods described include a robust object reacquisition methodology. By handling navigation and tracking autonomously, systems described herein can react quickly to non-cooperative moving objects of interest and can operate in situations where communications with external operators is compromised or absent.

While applications for sUAVs are on the rise, there are a number of challenges to operating them. First, since they generally fly at low altitudes, collisions with elevated ground obstacles and moving objects is a concern. sUAVs are subject to constraints on size, weight, and power (SWaP), and flight time and functionality are limited as a result. Importantly, prior sUAV systems have had to rely on GPS for navigation, two-way communications with human operators on the ground for video downlinks and control, and human operators in-the-loop themselves (especially for complex missions). As sUAVs are implemented in greater numbers (particularly in contested areas), the necessity for feedback from GPS and human operators becomes a bottleneck in the system. Systems and methods described herein provide autonomous navigation without exceeding SWaP requirements by employing machine learning techniques to identify and track objects of interest exclusively using a vision-based system, for example, without GPS guidance or operator guidance. As a result, little to no human intervention is needed and additional power drains such as GPS are also mitigated.

Furthermore, the tempo at which sUAVs operate at low altitudes for a variety of missions can be demanding, and human response time may be insufficient to react to dynamic events. Systems and methods taught herein improve the autonomy onboard sUAVs so as to reduce the workload on operators and improve the mission success probability. In some embodiments taught herein, UAV autonomy can be improved by exploiting the video streams collected by the camera onboard to autonomously perform navigation and geolocation, dynamic collision avoidance, and dynamic feature following and identification. Navigation and geolocation can be used to control the system to traverse between points but generally assume that the current location is known based on GPS. Examples of dynamic feature following include ship landing, road following, aerial refueling and object following.

In some embodiments, systems and methods described herein address the general problem of automated surveillance of objects of interest, which involves multiple phases of a response chain including object detection, tracking, identification, and engagement. Automating surveillance of objects of interest is challenging for a number of reasons. First, the object of interest can be uncooperative and potentially evasive, so following one requires dynamic replanning in a continuous manner. In contested environments with limited communications, the sUAV are not able to rely on a sustained video downlink to perform the necessary replanning from a remote ground station.

As used herein, "autonomous" refers to a system or module that is self-directing or self-determining without intervention from external persons or systems. For example, autonomous systems and methods described herein can perform one or more of image analysis, trajectory planning, object tracking, object reacquisition, and navigation without input from an independent operator.

As used herein, "waypoint" refers a physical location with respect to a coordinate frame with an origin at the object of interest. That is, the waypoint is a position in physical space relative to the object of interest. "Waypoint" can also refer to a specific view or view angle with respect to the object of interest. Notably, the use of waypoint is not to be constrained to coordinates with respect to a global coordinate frame (e.g., latitude, longitude, or altitude)

As used herein, "trajectory" refers to a sequence of waypoints while "path" refers to the route taken to pass through the sequence of waypoints.

FIG. 1 illustrates a small autonomous system 100 in accordance with various embodiments of the present disclosure. The system 100 can include a chassis 105, an imaging system 120, and a vision-based guidance system 150. The chassis 105 can include one or more motors 110 to enable and control movement of the chassis 105. The system 100 can use the vision-based guidance system 150 to autonomously plan and control movement of the chassis 105, imaging system 120, or both, to follow, surveille, or obtain additional information related to an object of interest without feedback from a human operator.

In accordance with various embodiments, the chassis 105 can include a land-, sea-, or air-based vehicle body. For example, the chassis 105 can include a car or truck body, a boat, a submarine or a plane body. In an exemplary embodiment, the chassis 105 can be a small unmanned aerial vehicle (sUAV) body such as that of a quadcopter or drone. In some embodiments, the chassis 105 can include an altitude sensor 107 such as an altimeter.

The one or more motors 110 can be integrated into the chassis 105 or mounted separately on the chassis 105. In some embodiments, the motors 110 can be attached to wheels, treads, rotors, propellers, or other means to enable the chassis 105 to move. In some embodiments, the motors 110 can include engines that produce thrust such as jet engines.

The imaging system 120 can include a still image camera or a video camera. In some embodiments, the frame acquisition rate of the imaging system 120 can be in a range from 5 to 70 frames per second. In accordance with various embodiments, the chassis 105 can move or tilt using the motors 110 to keep the object of interest in view of the imaging system 120. In some embodiments, the imaging system 120 can be attached to a gimbal 125 of the chassis 105. In some embodiments, the gimbal 125 can include three parts: a shaft that attaches at the center of the underside of the chassis 105 and two concentric spheres that attach to the bottom of the shaft. Yaw motion of the gimbal 125 can be controlled by rotating the shaft. Roll and pitch motions of the gimbal 125 can be controlled by rotating the spheres about their axes. For example, the intermediate sphere can control pitch while the sphere attached to the imaging system 120 can control roll. In some embodiments, roll motion is not utilized such that the gimbal 125 only effectively has two degrees of freedom. In some embodiments, the inertia associated with movement of the imaging system 120 can be much smaller than the inertia associated with movement of the chassis 105. In such a situation, independent control of motion of the imaging system 120 using the gimbal 125 is desirable as the imaging system 120 can then respond to changing conditions more quickly than the chassis 105.

An overview of operations, functions, and systems described herein enables autonomous surveillance by UAVs and is illustrated in FIG. 2. For example, a typical scenario might include conducting a surveillance mission searching for objects of interest. Once an object of interest is detected based on visual cues of the tracked object in a sequence of images, the system can self-direct itself to follow the object and can improve the observation distance and viewing angles with respect to the object of interest if there are insufficient image details to identify the object of interest. Select snapshots of what the system 100 sees can be relayed back to the operator in some embodiments to allow the operator to either affirm a potentially high-valued object of interest or abort following irrelevant objects of interest. Once sufficient details of the object of interest are captured, the system can either go back to search mode to look for the next object of interest or return to base. At the end of the mission, the system 100 can have a list of objects found, track histories for each object, and imagery of the objects including good quality identification.

FIG. 3 shows a block diagram representation of a processing and control architecture for implementing systems and methods described herein. The architecture includes vision processing phases 360 and quality assessment components 380 to monitor processing status. Different replanning schemes 370 can be invoked to execute high-level tasks. The vision processing phases 360 can include object detection 364, object acquisition 366, and object tracking 368. The surveillance process chain can be initiated with a coarse cue 352 to start an object search within the area of regard. The object search begins with an object detection phase 364. In some embodiments, the search can follow a predetermined scan pattern until a potential object of interest is detected. Once the object of interest is detected 364, the system can either automatically designate the object of interest as the acquired object of interest or the system can solicit input from a remote operator if there are multiple detections or ambiguity. After this object acquisition phase 366, the object tracking phase 368 begins. The system can then autonomously track the object of interest within the frame of the images and, based on the location and size of the bounding box on the object of interest, update the system's motion trajectory in real-time based on the principle of visual-servoing in order to follow the object of interest. A determination of whether the object is in view 382 is a quality assessment component 380 suited for this task. An appropriate system sensor kinematic model is used to implement the tracking control loop. By using an appropriate metric of track quality, the system 100 can monitor its progress and determine if the object of interest is still in view 382 or has been lost. If the object of interest is determined to have been lost, the system 100 can use a replanning scheme to reacquire the object 372 automatically and autonomously and can re-enter object acquisition mode 366. If an object is being successfully tracked, but could not be confirmed as a valid object of interest or positively identified 384, the system can use a replanning scheme to replan the trajectory 374. Replanning can work to reduce the standoff distance from the object of interest or to improve viewing-angle diversity to improve the confidence and enhance the identification quality of the observation.

A block diagram for the vision-based guidance system 150 according to some embodiments of the present disclosure is depicted in FIG. 4. The vision-based guidance system 150 can include at least one processor 157 and at least one memory 151. In some embodiments, systems described herein are subject to severe SWaP constraints. In such a situation, components are chosen for any given implementation based upon such considerations. In some embodiments, the processor 157 can include one or more central processing units (CPUs), graphics processing units (GPUs), or both. The processor 157 can execute instructions stored in the memory 151 to perform tracking or navigation tasks in accordance with the embodiments disclosed herein.

The vision-based navigation system 150 can include one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives, one or more solid state disks), and the like. For example, memory 151 included in the vision-based navigation system 150 may store computer-readable and computer-executable instructions or software (e.g., long-term planning module 152, gimbal controller module 155, vision processing module 154, low-level controller module 158, or short-term planning module 156) for implementing exemplary operations of the vision-based navigation system 150. The vision-based navigation system 150 can include one or more proportional-integral-derivative (PID) controllers 324 to implement control feedback loop(s) to tune the control signals to the motors 110 or gimbal 125 to optimize motion for factors such as smoothness or acceleration. In some embodiments, the PID controllers 324 can be layered (e.g., the output of one PID controller can feed into the input of another PID controller).

The vision-based navigation system 150 also includes configurable and/or programmable processor 157 and associated core(s) 304, and in some embodiments includes one or more additional configurable and/or programmable processor(s) and associated core(s) (for example, in the case of computer systems having multiple processors/cores), for executing computer-readable and computer-executable instructions or software stored in the memory 151 and other programs for implementing exemplary embodiments of the present disclosure. Each processor 157 may each be a single core processor or a multiple core processor. Each processor 157 may be configured to execute one or more of the instructions described in connection with vision-based navigation system 150.

In some embodiments, the processor 157 can satisfy a range of SWaP constraints. For example, low-SWaP options including ASIC, FPGA, GPU, and DSP processors. Modern CUDA-enabled GPUs, such us the Tegra K1 (TK1), consist of devices with one or more streaming multiprocessors (SMs) each containing multiple cores 304. GPUs work well for parallel applications with high-levels of fine-grain data parallelism. Computer Vision is an application in which there is little dependency between data elements or image pixels. This is often referred to as embarrassing parallelism, meaning that the task is easily broken into a number of smaller parallel sub-tasks. In some embodiments, the processor 157 can exploit thread-level parallelism (TLP) on multi-core CPUs or data-level parallelism (DLP) on the GPU. In some embodiments, DLP can be employed on CPUs by utilizing single instruction multiple data (SIMD) units. In another embodiment, a combination of GPUs and multi-core CPUs is used. The processor 157 can deliver over 320 GFLOPS while consuming less than 10 Watts of power in some embodiments. In some embodiments, the processor 157 can include a hardware-accelerated video decoder. In some embodiments, implementations of the tracking algorithm of the present disclosure running on hardware described herein can process between 5 and 10 frames per second and up to 50 frames per second in some implementations.

Memory 151 may include a computer system memory or random access memory, such as DRAM, SRAM, EDO RAM, and the like. Memory 151 may include other types of memory as well, or combinations thereof.

The vision-based navigation system 150 can include a network interface 308 configured to interface with one or more networks, for example, Local Area Network (LAN), Wide Area Network (WAN) or the Internet through a variety of connections including, but not limited to, wireless connections. In exemplary embodiments, the vision-based navigation system 150 can include one or more antennas 322 to facilitate wireless communication (e.g., via the network interface 308) between the vision-based navigation system 150 and a network and/or between the vision-based navigation system 150 and external systems. The network interface 308 may include a built-in network adapter, network interface card, wireless network adapter, or any other device suitable for interfacing the vision-based navigation system 150 to any type of network capable of communication and performing the operations described herein.

The vision-based navigation system 150 may run any operating system 310, for example, a suitable embedded operating system from Microsoft or a Linux-based embedded operating system or other suitable embedded operating system, any real-time operating system, any open source operating system, any proprietary operating system, or any other operating system capable of running on the vision-based navigation system 150 and performing the operations described herein. In exemplary embodiments, the operating system 310 may be run in native mode or emulated mode. In an exemplary embodiment, the operating system 310 may be run on one or more cloud machine instances.

The vision-based guidance system 150 can include component modules to handle specific tasks. In various embodiments, component modules can be implemented as libraries (e.g., dynamic link libraries), sub-routines, or function calls. The component modules can be stored in the memory 151 and executed by the processor 157. In various embodiments, the component modules can be implemented separately or one or more component modules can be integrated into a single module. In various embodiments, component modules can include a vision processing module 154, a gimble controller module 155, a long-term planning module 152, a short-term planning module 156, or a low-level controller module 158. The modules 152, 154, 155, 156, 158 can be a discrete part of a larger system or structure. In some embodiments, the modules 152, 154, 155, 156, 158 may be or contain individual routines that are compiled and called or dynamically linked.

In some embodiments, the vision-based guidance system 150 can acquire images of an object of interest using the imaging system 120. For example, the vision-based guidance system 150 can obtain a sequence of images or video from the imaging system 120. The vision processing module 154 of the vision-based guidance system 150 can process the images acquired by the imaging system 120 to determine the object position or size of the object in camera view coordinates. In some embodiments, the object position can be represented as the XY position in the camera image. In some embodiments, the vision processing module 154 can assess whether the object of interest continues to be in the field of view, whether object observations have sufficient quality to support identification, or the location of the object of interest in the field of view as described below.

In some embodiments, the vision-based guidance system 150 can automatically detect the object of interest in the sequence of images. In some embodiments, the vision-based guidance system 150 can apply background subtraction performed on registered images or can use specialized object detectors. In other embodiments, the vision-based guidance system 150 can utilize a convolutional neural network to detect the object of interest in one or more images.

As described below in greater detail with reference to FIGS. 7A-9, the vision processing module 154 can create or update an object model 159 using machine learning techniques. In some embodiments, the vision processing module 154 can include an image or video analytics engine suitable to acquire or receive a sequence of images from the imaging system and process the sequence of images to detect, track, and identify objects therein. Information about the detected objects can be used to make determinations of object size and location relative to the system 100 or determinations as to whether the object has been lost or whether the object has been satisfactorily identified. These values can be input into the long-term planning module 152 and the gimbal controller module 155 of the vision-based guidance system 150 so that they can coordinate motion of the chassis 105 or imaging system 120 relative to the object of interest. The gimbal controller module 155 is described in greater detail below.

The long-term planning module 152, short-term planning module 156, and low-level controller module 158 can cooperate to plan and control the motion of the system 100. The long-term planning module 152 can produce a trajectory that includes desired altitudes, desired distances from the object of interest, and desired viewing angles with consideration of the current tracking mode (i.e., whether a detected object is being tracked or not) to improve the diversity of observations of the object of interest. The long-term planning module 152 is described below in greater detail with reference to FIGS. 13-23.

The short-term planning module 156 can receive relative waypoints of the planned trajectory from the long-term planning module 152 and gimbal state information from the gimbal controller module 155. Based on the received information, the short-term planning module 156 can calculate a 3D vector between system 100 and the object and produce 3D velocity commands to move the system 100 in the desired direction.

The low-level controller module 158 receives the 3D velocity commands from the short-term planning module 156 and can convert the commands into appropriate servo control signals to the motors 110. In some embodiments, the low-level controller module 158 can perform state estimation based on the use of, for example, Kalman filters. The low-level controller module 158 can feedback state or motor information back to the short-term planning module 156. In some embodiments, the low-level controller module 158 can be implemented in the vision-based navigation system 150 as either a software package or a dedicated hardware controller.

In some embodiments, the vision processing module 154 of the vision-based guidance system 150 can employ a tracking algorithm to identify properties of an object of interest through a sequence of images. The tracking algorithm can operate based on one or more different concepts including, but not limited to, background-subtraction, optical flow/motion-based, complex appearance model-based, part-based, keypoint-based, and discriminative learning. In particular, discriminative learning methods (i.e., machine learning) are appealing from the standpoint the models generated thereby are relatively persistent and robust in the sense that they have the ability to maintain lock on the object of interest in the presence of clutter and view obstruction. Object models trained through discriminative training methods can provide a good basis for reacquiring an object of interest upon track loss in the presence of clutter because of the discrimination characteristics of the object model 159.

In some embodiments, the object model 159 can be initialized using an initial image for which a detected object is confirmed. In some embodiments, the object model 159 can be initialized using a standard model that was previously trained using a corpus of images. The standard model can be specific to a particular class. The vision processing module 154 can continuously update the object model 159 using the training method while the object is still detected within newly acquired images. In some embodiments, the vision processing module 154 can halt updating the object model 159 upon a determination that the object of interest has left the field of view of the imaging device 120 as reflected in the object's disappearance from newly acquired images. In some embodiments, the vision processing module 154 can resume updating the object model 159 upon a determination that the object has re-entered the field of view of the imaging device 120 as reflected in the object's re-appearance in newly acquired images.

In some embodiments, a support vector machine (SVM) can be used as a discriminative learning or training method. For example, kernelized structured output SVMs and other variants such as Structured Output Tracking with Kernels (STRUCK) can create and update the object model 159 by using machine learning techniques in an unsupervised fashion. By explicitly allowing the output space of the SVM to directly represent the output of the video tracker, STRUCK does not require the label of the observed data to be predicted during online learning. To improve real-time application, a budgeting mechanism can be applied to prevent the unbounded growth in the number of support vectors that could otherwise occur during tracking.

FIG. 5 illustrates a flowchart for a method 500 of autonomously tracking an object of interest in accordance with various embodiments described herein. The method 500 includes acquiring images of the object of interest using an imaging system attached to a chassis (step 502). For example, the imaging system 120 attached to the chassis 105 as described above with reference to FIGS. 1 and 4. The method includes analyzing the images of the object of interest to determine an object position and an object size relative to the imaging system (step 504). For example, images can be analyzed using the vision processing module 154 of the vision-based navigation system 150 described above with reference to FIGS. 1 and 4.

The method includes determining a trajectory relative to the object of interest (step 506). For example, the trajectory can be determined using the long-term planning module 152 of the vision-based navigation system 150 described above with reference to FIGS. 1 and 4. The method also includes controlling the one or more motors to move the chassis along the trajectory while keeping the object of interest in view of the imaging system (step 508). For example, the short-term planning module 156 and low-level controller module 158 of the vision-based navigation system 150 can control the motors 110 to move the chassis 105 as described above with reference to FIGS. 1 and 4.

FIGS. 6A-6F illustrate the results of implementing the tracking algorithm using the vision processing module 154 in accordance with embodiments described herein at various stages of a test video collected from a UAV as part of the Defense Advanced Research Projects Agency's (DARPA) Video and Image Retrieval and Analysis Tool (VIRAT) program. The tracking algorithm successfully tracked a ground vehicle along a road and all the way through the U-turn it made toward the end of the sequence, as shown in FIG. 6A to FIG. 6D. In some embodiments, a track confidence score can be determined based on the rate of change of SVM scores to monitor the quality of tracking. For example, if the rate of change of the SVM scores indicates that the object is no longer shown in the image, the object model 159 can stop being updated as described in greater detail below with reference to FIGS. 8A-8C. In some embodiments, the systems and methods can automatically enter a search mode to reacquire the object of interest in an image. In an exemplary embodiment, the system can autonomously attempt to reacquire images of the object in an expanded search space by using the most current object model 159. For example, in FIG. 6E, the object leaves the field of view. At this point, the tracking algorithm can determine that the object has been temporarily lost. In FIG. 6F, the object re-enters the field of view about three seconds later, and the tracking algorithm successfully reacquires the object of interest when it becomes fully visible again.

In various embodiments, the tracking confidence score can include a score output by the discriminative learning-based tracking algorithm. For example, the tracking confidence score can include raw scores output by a support virtual machine (SVM) or a rate of change of the scores output by a SVM. FIGS. 7A and 7B show the SVM scores and the rate of change in SVM scores for the track depicted in FIGS. 6A-6F, respectively. According to embodiments of the present disclosure, the vision-based guidance system can compute a rate of change of a score between a first image and a second image as determined by the discriminative learning-based tracking algorithm. In some embodiments, the SVM model similarity score of an image with respect to a reference image is calculated based on the sum of distances from the positive and negative support vectors that are discovered during each learning cycle. Although the distance metric can be normalized in some way, an imbalance of positive and negative samples and consequent corruption of training data during unsupervised training can lead to bias in the optimal decision threshold. Generally, the SVM scores change gradually as the model is adaptively updated while the object of interest is in view. In some embodiments, a statistical variation of the SVM scores is within ±0.5 while the object of interest is in view. In response to the rate of change of the score being greater than or equal to the threshold value, the object model 159 can be updated using a subsequent image by the discriminative learning-based tracking algorithm.

On track loss, there can be a significant change 700 in the SVM scores (e.g., FIG. 7A at frame 1500) because the image including just surrounding clutter without the tracked object does not match the model well. The significant change 700 in SVM scores stands out as a large peak 702 when computing the rate of change of SVM scores as shown in FIG. 7B. In some embodiments, loss of tracking of the object occurs when the rate of change of the SVM scores exceeds a threshold value. In an exemplary embodiment, the threshold value for determining when loss of tracking has occurred is a statistical variation in the rate of change of the SVM scores of ±0.5. In some embodiments, the vision-based guidance system can respond to the rate of change of the score being less than the threshold value by halting updating of the object model 159. If the object model 159 continues to be updated when the object has exited the field of view, the object model 159 continues to train with scene clutter included as positive samples. The inclusion of scene clutter reduces the effectiveness of the object model 159. As shown in FIG. 7A after ~sample 1500, the system maintains a stable SVM score after a loss of tracking event, which represents successful reacquisition of the object of interest.

In some embodiments, features of the images that are important to the object model 159 for reacquisition can be normalized based on changes in an expected observation distance and a field of view of the imaging system 120. Normalization can take on particular importance when the object of interest is lost for longer durations. In some embodiments, systems and methods described herein can exploit an estimate of the last-known object location with respect to the system 100 when the track is lost by bounding the search space to improve reacquisition success. For example, the system can enter a modified search mode where priority is assigned to certain views and angles near the estimated last-known location.

The importance of monitoring the track quality can be further illustrated by FIGS. 8A-8C. In FIG. 8A, the object model 159 ceased updating during track loss in accordance with embodiments described herein. In some embodiments, the object model 159 cannot resume updating until a track confidence level is reached after the object of interest is reacquired. FIG. 8B and FIG. 8C illustrate situations where the object models 159 continued to be updated after a momentary track loss and a longer track loss, respectively. While the object model 159 in FIG. 8A remained intact after the object of interest was lost, the object model 159 in FIG. 8B was corrupted with three false positives 705. The applied object model 159 as illustrated in FIG. 8C continued to update during a long track loss and became extremely unstable as more false positives than true positives were included. The object model 159 of FIG. 8C is significantly less useful for object reacquisition. Tracking objects of interest at low altitudes is especially challenging because imagery in the field of view (FOV) evolves at a high pace and, thus, a mechanism to quickly and autonomously reacquire an object of interest when it becomes lost is even more important.

In some embodiments, the processor 157 can adjust the images to compensate for motion of the chassis 105, imaging system 120, or both. Any motion of the object of interest observed in a sequence of images is a combination of motions of the chassis and imaging system with respect to the object of interest. Chassis or imaging system motion can be intentional (such as when the chassis is moving to follow an object of interest) or unintentional (such as when the chassis is moved by external forces such as wind). By compensating for the motion of the system, the motion of the object of interest can be extracted from the sequence of images. In some embodiments, the sequence of images is analyzed to identify consistent background features such as landmarks or horizons. The consistent background features can then be matched from frame to frame to generate an estimate of the rigid motion of the chassis.

FIG. 9 illustrates a mosaic image resulting from stitching successively acquired images that were adjusted using a feature-based matching algorithm. In some embodiments, the feature-based matching algorithm can be an implementation of Speeded-Up Robust Features (SURF). The quality of the mosaic construction in FIG. 9 provides an indication of how well the motion of the object of interest can be estimated in a global reference frame.

In various embodiments as described above, the imaging system 120 can be mounted to the chassis 105 directly or through a gimbal 125. In embodiments without a gimbal 125, the system 100 must control its motion to aim the imaging system 120 at the object of interest as the system moves. In some embodiments, the low-level controller module 158 can turn, tilt, or angle the system 100 to maintain the object of interest in the field of view of the imaging system 120.

In some embodiments, the imaging system 120 is attached to a gimbal 125 of the chassis 105. The gimbal controller module 155 can accept object data in camera view coordinates from the vision processing module 154 and output velocity commands to the gimbal 125 to control the pitch and yaw angles of the gimbal 125 to keep the object of interest in view. In some embodiments, the gimbal controller 155 can receive data from the vision processing module 154 associated with the location of the object of interest in the image plane. Based on the received data, the gimbal controller 155 can control the gimbal 125 to point the imaging system 120 directly at the object of interest (e.g., to center the object of interest in the image). The gimbal controller 155 can provide information about the object location and the imaging system pointing direction to the short-term planning module 156 to aid in planning the path to the next waypoint. In embodiments without a gimbal 125, the vision processing module 154 can output object data in camera view coordinates directly to the short-term planning module 156 to account for motions needed to continue tracking the object.

For example, the object of interest direction in the camera frame is a line starting from the origin of the camera frame and going through the pixel position of the object of interest. Let the z-axis in the camera frame be perpendicular to the image sensor. The focal length of the camera (in pixels) defines the z-coordinate of the object direction, and the pixel coordinates define the x and y coordinates. The object direction in the system's body frame can be computed using a simple change of coordinates. In some embodiments, the gimbal controller module 155 can return a vector in the body frame that points at the object of interest. The new pitch and yaw angles for the gimbal 125 can be calculated with trigonometric equations given the unit vector pointing at the object of interest in the body frame. The pitch depends only on the z-coordinate: $\phi_{new}=\sin^{-1}(z)$. The yaw depends on the ratio of the x and y coordinates, and their signs: $\phi_{new}=\operatorname{atan2}(y, x)$. The gimbal controller module 155 can provide gimbal state information including pitch and yaw angles to the short-term planning module 156 as described below.

To control the motion of the chassis 105 in an object-relative mode using vision-based guidance, the short-term planning module 156 can implement one or more relative navigation modes that are chosen based upon what information is to be gathered about the object of interest. Relative navigation modes are distinguishable from absolute navigation modes that rely upon information provided by a global positioning system (GPS). Object-relative navigation modes implement motion relative to an origin centered on the object, which can be moving. In some embodiments, each relative navigation mode can be supported by a corresponding controller implemented as software or code in the short-term planning module 156. Each controller can act as a building block for a more complex control scheme implemented by the short-term planning module 156. Controllers supporting relative navigation modes can include a hover controller, a flyover controller, an orbit controller, a spiral controller, or a view-angle controller. In some embodiments, the vision-based navigation system 150 can autonomously control motion of the system 100 to track the object of interest using relative navigation modes implemented by controllers to obviate the need for external control by a remote operator. In some embodiments, only one controller is applied at any given time.

For example, the hover controller can control the motion of the system 100 to hover at a desired cruising altitude A based on feedback from a proportional-integral-derivative (PID) gain controller 324. In some embodiments, the PID gains can be tuned using a Ziegler-Nichols method.

The flyover controller can control the motion of the system 100 to move directly above the object of interest at a desired cruising altitude A. For example, the flyover controller can calculate the x-y distance to the object of interest as the distance error and can use a PID controller 324 to compute the desired velocity in the direction of the x-y error as shown in FIG. 10. In some embodiments, the flyover controller output can be made more stable by limiting the velocity. In an exemplary embodiment, the velocity can be multiplied by $\cos(\phi)^3$. Such a velocity limiter can stabilize the velocity but may also cause the motion of the system 100 to respond more slowly to object movement. In some embodiments, altitude can be managed using an independent PID controller 324.

The orbit controller can control the motion of the system 100 to orbit the object of interest at a desired radial distance, circling speed, or cruising altitude. The orbit controller can provide control in three directions. In some embodiments, each direction can be controlled using an independent controller. The resulting velocity command provided by the short-term planning module 156 can then be a summation of the three velocities to give the resulting velocity command as shown in FIG. 11.

The z-velocity can be controlled using the same PID controller 324 as described above with reference to the hover controller. The velocity in the direction toward or away from the object of interest in the x-y plane ($V_r$) can have its own PID controller 324, and the circling velocity ($V_t$) can be fixed in the direction perpendicular to the object of interest in the x-y plane in some embodiments.

The direction to the object of interest is given by the roll, pitch, and yaw angles of the gimbal and the chassis 105. Given these angles (r, p, y), the direction to the object of interest in the system's body frame is:

$$\hat{d}_b = \begin{bmatrix} \cos(p_c)\cos(y_g) \\ \cos(p_c)\sin(y_g) \\ \sin(p_c) \end{bmatrix} \quad (1)$$

In Equation 1, the subscript g indicates an Euler angle of the gimbal while the subscript c indicates the camera frame, which has Euler angles resulting from the combination of the system's body Euler angles and the gimbal's Euler angles. Note that the direction vector illustrated in Equation 1 is actually in a stabilized body frame, that is, what the body frame would be if the system's roll and pitch angles were both 0. For system embodiments where the chassis is a quadrotor sUAV, this formulation can be a more useful frame to work in because such devices generally interpret velocity commands as being in this frame. Note that the yaw angle comes only from the gimbal and not from the system's body. This occurs because velocity commands are given in the system's body frame.

The spiral function can control the motion of the system 100 to spiral around the object of interest at a desired distance and circling speed but at a changing altitude. There are two ways to think of how this controller works. First, a spiral is just a circle with a varying altitude. Thus, the spiral controller design is similar to that of the orbit controller but with changing altitude and a decrease in the radius of the circle as the system ascends such that the system 100 maintains the same distance from the object of interest. Second, a spiral (in the sense of the spiral controller) is a path along the surface of a hemisphere. Thus, the motion commands from this controller are analogous to starting on the equator and walking north while circling the hemisphere. In some embodiments, the spiral controller can achieve essentially every possible view of the object of interest in a discrete sense.

The view-angle controller can control the motion of the system 100 to move such that the gimbal 125 points at the object of interest at specific desired pitch and yaw angles. In some embodiments, this controller can be useful if getting a particular view of the object of interest is informative. For example, it might be useful to photograph a vehicle from behind in order to see its license plate. Similarly, it might be useful to photograph a human from the front and side to get views of the face and the side profile, respectively.

One possible implementation of the view-angle controller is described as follows. First, calculate the vector to the object of interest just like for the orbit or spiral controllers. Then, multiply the vector by the distance to the object of interest so that it's no longer a unit vector: $\vec{d}_b$. Next, calculate the vector to the object of interest when the gimbal has the desired angles and the system is the desired distance from the object of interest using the same formula as above but with the body roll and pitch assumed to be 0: $\vec{g}_b$. Calculate the vector pointing from the current position to the desired position by taking the difference between the two vectors described above. Finally, calculate the difference in angle between the current vector to the object of interest and the desired vector to the object of interest using the formula in Equation 2:

$$\alpha = a\tan 2(|\vec{d}_b \times \vec{g}_b|, \vec{d}_b \cdot \vec{g}_b) \quad (2)$$

The formula in Equation 2 is more accurate than other theoretically equivalent formulae when the angle is close to 0 or close to $2\pi$. With this information, the commanded velocity output by the short-term planning module 156 is the sum of two velocities: the velocity in the direction to the new viewing position and the velocity toward or away from the object of interest. As in the other controllers described above, the distance from the object of interest can be managed by a PID controller 324.

If the system 100 is already the desired distance away from the object of interest, the path to the new viewing position is a great circle of a sphere with length $\alpha|\vec{d_b}|$. In some embodiments, to make the motion of the system 100 more stable as it approaches its desired viewing position, the commanded speed toward the new viewing position can be proportional to $\alpha^3|\vec{d_b}|$. This formula is different from the actual distance along an arc to the new viewing position but can produce better behavior and is the same in the limit $\alpha \to 0$.

Most of the controllers described above aim to keep the viewing distance from the object of interest constant as the system 100 maneuvers. Such a goal can be challenging to implement manually because several degrees of freedom are involved. For example, if it is desired for the system to pass through a series of view angles at varying distances, the problem is analogous to conventional waypoint-based navigation except that everything is performed relative to the object of interest that can be moving as illustrated in FIG. 12. In this coordinate system where the origin is the current location of the object of interest, the axes can be oriented using a compass with the z-axis pointing up, and the y-axis pointing north.

The position of the system in the object's coordinate frame can be given as:

$$\vec{x_t} = -R_b^w \vec{d_b} \qquad (3)$$

The rotation matrix $R_b^w$ rotates from the system's stabilized body frame to the object-centered frame. Because we can ignore the system's roll and pitch angles, the matrix is given by:

$$R_b^w = \begin{bmatrix} \cos(\phi) & -\sin(\phi) & 0 \\ \sin(\phi) & \cos(\phi) & 0 \\ 0 & 0 & 1 \end{bmatrix} \qquad (4)$$

The difference vector between the current position and the desired position can then be rotated back into the system's stabilized body frame.

The role of the long-term planning module 152 is to provide intermediate goals in the form of waypoints to the short-term planning module 156 to fulfill certain high-level objectives. For surveillance missions, key high-level objectives can include detection, tracking, and identification of potential objects of interest with minimal operator intervention and, potentially, in contested areas where communications and GPS might be unreliable. To improve the ability to identify a particular object of interest, the high-level control strategy implemented by the long-term planning module 152 in some embodiments can seek to maximize the information gained about the object of interest. In some embodiments, the system 100 can determine and select the most informative images from among a sequence of images of the object of interest to be sent back to a human operator for situation awareness or feedback.

In some embodiments, the long-term planning module 152 can implement a strategy to capture more pixels on the object of interest by moving towards the object of interest to reduce the observation distance thus improving the quality of the observations to support identification. In exemplary embodiments, the long-term planning module 152 can implement an information-theoretic method to improve the quality of the observations via view diversity.

The view diversity methods implemented by systems and methods described herein aid in selecting a representative subset of data from the sequence of acquired images. One naïve way to go about this is to uniformly sample from the dataset. While in some cases this might work effectively, the naïve method does not utilize any of the data actually collected and is likely to miss rare events or pieces of key information that exist in just a few of the sequence of acquired images. Systems and methods described herein can take an information theoretic approach by aiming to maximize the information gain in the selected image set using an extension of mutual information.

Mutual information is a measure of independence between images X and Y, with elements denoted x and y respectively, and is defined as follows:

$$I(X, Y) = \sum_{y \in Y} \sum_{x \in X} p(x, y) \log\left(\frac{p(x, y)}{p(x) p(y)}\right) \qquad (5)$$

This can be rewritten in terms of the entropy, $H(x) = -\Sigma_i P[x_i] \log P[x_i]$, as follows:

$$I(X, Y) = H(X) + H(Y) - H(X, Y) \qquad (6)$$

Since we would like to have a measure of the similarity of the images, we consider the Variation of Information (VI):

$$VI(X, Y) = H(X) + H(Y) - 2I(X, Y) \qquad (7)$$

The VI is tightly related to mutual information, but satisfies the properties of a metric, giving a measure of information distance between the two images. Using this metric to relate the images in a multi-view dataset from a sequence of images, we are able to assess the amount of information gained in a particular image sequence. This is visualized in FIG. 13 for the first image 1305 and the second image 1307. Because the information gain metric is symmetric, implementations need only compute the pairwise comparison on the images in the sequence following the reference image. For example, the first image 1305 is pairwise compared to the four images subsequent to it in sequence but the second image 1307 need only be pairwise compared to the three images subsequent to it in sequence. An example of a VI metric relationship that was identified between perspectives is illustrated in the left image of FIG. 14A.

In some embodiments, the long-term planning module 152 of the vision-based navigation system 150 can plan a motion trajectory relative to an object of interest by computing a variation of information metric using the acquired images of the object of interest. The variation of information metric can provide a measure of information gain. In some embodiments, the vision-based navigation system 150 can determine a waypoint based on the measure of information gain. The vision-based navigation system 150 can then use the short-term planning module 156 to plan a path to reach the waypoint.

In FIGS. 14A and 14B, we make the following observations about the VI metric versus perspective. First, note the sharp drop in VI when the 360 degree rotation has been completed. A comparison of Images 1401 and 1406 shows that they are nearly identical. The response is highly related to the geometry. The greatest value of VI can be found where the vehicle is most different in size (e.g., the side views as shown in Images 1402 and 1403), which intuitively makes sense as the distribution would vary significantly due to the relative size of the vehicle when compared to the background. A local minimum in value of VI can be found near the back of the vehicle (Image 1404), which is relatively similar to the front in shape. There is a peak near the minima, where there is temporarily a good deal of information considered independent. As shown in Image 1405, we see an interesting event occur, where a human appears in front of the camera, obstructing the view of the car.

FIG. 15 illustrates a VI map for an example vehicle object. The y-axis represents the image or perspective to which the following images are compared. The x-axis corresponds to the next image or perspective. The dark blue is zero or has not been computed due to the symmetries, whereas red corresponds to a high VI response.

The above description generally holds when using any viewpoint as the reference. As we sweep 360 degrees starting from a different observed perspective and compare it to all other images, we get a fairly similar response profile with some slight differences unique to the image pairs. As described above, the VI need only be computed for images in the sequence following the new reference image as the metric is symmetric. By stacking these signals together, we can then generate a matrix representation or a mapping between the images as shown in FIG. 15.

As described above, we would like to select a small but representative subset of the images that is most informative. Suppose we would like to select a subset consisting of a fixed number of images, K, from the original dataset consisting of N images or perspectives. We note that images and perspectives are interchangeable in this formulation due to the fact that each image corresponds to a specific viewing angle. In the example case where we are circling the object of interest (i.e., rotating only along the azimuth), each image corresponds to a perspective index that gives us the relative orientation or viewing angle of the camera. If we extend this to the 3D case, where we spiral around the object of interest (i.e., rotate in both azimuth and elevation angle), these images are then associated with an index for the corresponding perspective that is a tuple for both azimuth and elevation viewing angles of the camera. For any subset or sequence of images, denoted by $s_q(k)\ \forall k=\{1,\ldots,K\}$, where q marks the index in the set of feasible sequences, we calculate the total information gain along the sequence:

$$G_q = \Sigma_{k=1}^{K} g_{s_q}(k) \tag{8}$$

In Equation 8, $G_q$ is the total information gain for the sequence, $g_{i,j}$ represents the VI metric between images i and j, and $s_q$ is the transitions between images in the sequence $q \in \{1,\ldots,Q\}$, and Q is the number of feasible sequences.

The information gain between all images (note that the calculation is symmetric) can be calculated and represented as a weighted graph where the nodes are the images associated with a particular perspective and the weights of edges between nodes are the VI metric. Given a starting node and assuming that we can only move "forward" in our image set (i.e., the adjacency matrix is upper triangular, as was shown in FIG. 15), we would like to identify the path in the graph that maximizes our total information gain, as previously defined.

While the method for building the VI map is relatively straightforward, the computationally difficult aspect is getting the feasible paths. This can be thought of as a combinatorial problem where we would like to generate all unique combinations of $v=[2,\ldots,N]$, where N is the number of images in the set of length K. Ideally, the total gain for all feasible paths would be calculated and the maximizer selected. However, as K and N increase, Q would become extremely large making identifying all feasible paths quite computationally expensive. Experimentally, it was found that if less than 125 images are considered and no more than five images are to be selected, the solution can be computed quite efficiently. To mitigate this problem, two potential solutions are recommended. First, assuming we have a fixed K and N, a lookup table can be used so only the costs need to be calculated. Second, a greedy algorithm can be implemented to identify local maximizers within a specified window to provide a set of potential paths.

To test this implementation of image selection, the selection algorithm was applied to a multi-view dataset consisting of sequences of images for each of twenty different vehicles sweeping over 360 degrees at near ground level. Since the perspectives associated with this dataset lie on a circle about the vehicle, this dataset is referred to as the 2D dataset in contrast to the 3D case described below. The dataset provided tight bounding boxes around the vehicles that were loosened to be a fixed size, which is required to properly calculate the VI metric. By loosening the bounding box, background interference was only partially eliminated but the varying geometry and relative sizing were able to be captured.

An example of the output for three of the twenty vehicles is shown in FIG. 16. In testing, we found that fixing K to four worked well when considering the 360 degree perspectives. This was determined by plotting the diminishing returns of adding another image to the sequence. In the example outputs, we can see that there is some redundancy in the last selected image. Intuitively this makes sense, given that we are likely to begin getting some redundancy after we have viewed the four sides of the vehicle.

We discuss the necessary validation below and note that anomalous events are expected to be more likely to be identified with this method. In the example illustrated in FIGS. 17A and 17B, the present method (FIG. 17A) was able to select the anomalous event 1702 whereas the event was missed by naïve, uniform sampling (FIG. 17B).

The methodology can be generalized to the three dimensional world. Thus, instead of just looking at a 360-degree view of the object of interest at nearly ground level, embodiments described herein can consider a set of perspectives defined by both azimuth and elevation angle that can be thought of as the 3D extension of the previous dataset. Instead of circling about the object of interest, systems of the present disclosure can execute a spiral like pattern to capture a wide variety of perspectives that lie on the sphere centered about the object of interest. To test this proposition, a small dataset was generated including five hundred perspectives that were sampled uniformly at varying azimuth and elevation angle ranges given by $\theta=\{0,\ldots,2\pi \cdot n_s\}$ and $$\varphi = \{0, \ldots, \frac{\pi}{2}\},$$

where $n_s$ is the number of orbits about the object of interest, which was set to five. FIG. 18A illustrates the spiraling path 1802 of the system and FIG. 18B illustrates the most informative images (N equals 5 in this case) that were automatically selected by the algorithm.

The vision-based navigation system 150 as taught herein can utilize different control strategies in an effort to autonomously maximize information gain. In some embodiments, the vision-based navigation system 150 can identify one or more waypoints corresponding to the next best views, given the system's current perspective, and determine a path to reach the one or more waypoints. In this framework, given our current perspective, the system can identify the next K views that would maximize our information gain. The selection of waypoints and determination of the path to reach them can be made in real-time without input from external sources such as remote operators.

The information known to the system can, in some instances, be insufficient to identify the next view to improve information gain. For example, unless the vision-based navigation system 150 has already gathered a multi-view image sequence of the object of interest, it cannot identify the next-best perspectives precisely using the algorithm described above. In such a situation, the vision-based navigation system 150 can identify the waypoint corresponding to the estimated next-best view in a lookup table based upon the current location of the system in relation to the object of interest. For example, if the system identifies the class of object of interest (e.g., a vehicle, an individual, a building, or a natural feature), the vision-based navigation system 150 can utilize a template or expected VI response based on the object class. As shown above, vehicles tend to give similar responses subject to slight variations that are unique to the vehicle itself and the background noise. Using the averaged template response, the lookup table can be built from a generic Information Gain Map and include the estimated next best views given any current viewing angle. Example results of averaged VI templates for vehicles for the two dimensional and three dimensional datasets are shown in FIG. 19 and FIG. 20, respectively. A sufficiently large and balanced database of classes and objects provides the vision-based navigation system 150 with more refined estimates as inputs for multi-view object identification. In some embodiments, classes of objects can be systematically studied using three-dimensional CAD models in a simulation environment to establish generalized categories.

Using the template from the 2D dataset, the system can obtain future reference points or desired perspectives in a generalized manner. For instance, if the system 100 is in a low orbit the most informative waypoint could be located at a low altitude and at a 100 degree change in perspective relative to the starting point as shown in FIG. 19. This generally holds for all initial perspectives (i.e., the starting view does not affect the likely next best viewing angle).

In the 3D case (and assuming the system starts above the object of interest), the averaged response reveals that information gain is maximized by dropping to a lower orbit, as the distribution of information tends to increase as the perspective circles downward. Unlike the 2D case, it is harder to generalize and to develop a reliable heuristic (e.g., to always go to a certain next-best perspective) as the 3D case is so closely tied to two variables. In some embodiments, the lookup table can use the generic or expected VI metric map (symmetric in some cases) as shown in FIG. 21.

As with the previous maps, FIG. 21 shows the variation in information relationship between any two images. Each row of the matrix includes the complete VI metric response to all other images or perspectives. In a scenario where the system 100 that is tracking a ground object of interest and knows its current viewing perspective (e.g., derived from the gimbal position), the nearest neighbor perspective in the template tells us which row the system 100 is currently nearest to in the matrix. Then, the column index that is associated with the maximum VI response provides the next best perspective. In some embodiments, the vision-based guidance system can implement a greedy algorithm to select the next-best perspective. The greedy algorithm implementation considers only the perspective that provides the greatest information gain and does not consider the maximum gain that can be obtained over a sequence. Such an implementation tends to work well in practice and is relatively efficient. In some embodiments, the system can acquire additional images as it moves to the waypoint. Then, the individual additional image frames can be analyzed in the manner described above to refine the identification of the optimal images to be selected. By using the added information from additional images, the vision-based navigation system 150 can shift to relying on real-world data and drop the assumptions made in using the template.

In some embodiments, the vision-based guidance system 150 can plan a trajectory relative to the object of interest based upon information about where informative views generally lie. Such an implementation is less reliant upon assumptions regarding the object of interest (such as class). To maximize the number of unique perspectives, one method could be to orbit at a variety of different altitudes or to spiral about the object of interest as if on a sphere as shown in FIG. 22A. While this would maximize the number of perspectives and not require assumptions about the object of interest, the resulting trajectories are highly inefficient (which is undesirable when considering the flight time limitations on some systems described herein) and introduce a great deal of redundancy in the data and information collected about the object of interest.

In some embodiments, the vision-based navigation system 150 can determine the waypoint based on a measure of information gain by selecting the waypoint from a pre-determined path. In some embodiments, the pre-determined path can be determined by running the image selection algorithm on a dataset including test images. For example, the ten most informative views can be identified by observing the distribution of perspectives selected in a given dataset. Using these perspectives as waypoints, we can create a desired path to pass through the waypoints that can be used as a template maneuver to be applied to a control framework. The resulting trajectory and path shown in FIGS. 22B and 22C. Note that there is a slight distinction between waypoints and perspectives. Generally, waypoints are specific states in the world that act as guides for the system. In some embodiments, waypoints are defined as x-, y-, and z-coordinates that the short-term planning module 156 of the vision-based guidance system 150 can use to design the desired motion trajectory for the system in the global coordinate frame.

In some embodiments, a desired distance or altitude between the object of interest and the system can be calculated, for example, to improve identification of the object of interest. In accordance with various embodiments, the vision-based navigation system 150 can compute or access in memory the desired distance or altitude without external input from remote operators. The desired distance or altitude can be computed by estimating the size of the object in one or more acquired images using computer vision algorithms in an attempt to adjust the relative size of the object of interest in the image. In some embodiments, the vision-based guidance system 150 can assume a certain radius or desired distance that can be altered as needed. In some embodiments, the vision-based guidance system can reduce redundancy in a pre-determined spiral maneuver by cutting the number of orbits needed to collect informative data. The pre-determined path can attempt to minimize the information overlap by including specific parameters for the spiral (e.g., number of times to orbit the object of interest, what elevation viewing angle is optimal). In some embodiments, the system can apply the image selection algorithm for efficient processing or as feedback to the human operator after completing said trajectory and obtaining a multi-view image sequence.

By initializing with a pre-determined trajectory including waypoints as described, the system follows an optimized control framework that can be tuned to follow the desired trajectory and update and adjust as the object of interest is tracked.

An example of formulation of the pre-determined path is described as follows. In a scenario where the system 100 is tracking an object of interest and estimating the object's state (e.g., position, velocity, and heading), waypoints forming the desired trajectory relative to the object of interest and the object's projected motion can be defined. Using this trajectory, systems and methods of the present disclosure can apply an optimal control framework posed as the following optimization program to solve for the optimal trajectory and control input over a finite time horizon:

$$\text{minimize}_{x,u} J(x, x^d, u) \quad (9)$$

$$\text{subject to } x_{t+1} = f(x_t, u_t) \forall t \in \{0, \ldots, T\}$$

$$u_t \in \mathcal{U}_t, x_t \in X_p, x_0 = x_s$$

$$\tilde{x}_{t+1} = A\tilde{x}_t \forall t \in \{0, \ldots, T\}$$

where the objective function above is given by $$J(x, x^d, u) = \Sigma_{i=0}^T (x_i - x_i^d)^T P (x_i - x_i^d) + u_i^T Q u_i \quad (10)$$

which penalizes deviation of x from the desired path $x^d$ (p, $\tilde{x}$), taking into account waypoints p and the states estimates $\tilde{x}$ of the object of interest. The parameters used are defined in Table 1.

While such a problem is generally nonconvex due to nonlinearities in the dynamics (meaning optimality is not necessarily guaranteed), this method has been found to work well in practice and can be approximated and/or solved fast enough to be readily implemented in a receding horizon fashion.

TABLE 1

Parameter Definitions in Eqs. (9) and (10)

| Variable | Definition |
|---|---|
| x | State representation of the system. While here the formulation is general, this is represented in some implementations as the position and orientation of the system. |
| $x_0$ | Initial state of the system, which is represented as an equality constraint. |
| u | Inputs to the system. In one implementation, these are in the form of velocity commands to each state. |
| $\tilde{x}$ | Estimated state representation of the object of interest. |
| A | Transition matrix for modeling the simplified dynamics of the object of interest. In some embodiments, a constant velocity model is assumed meaning that given the current speed and heading, the object of interest would continue traveling in that manner. |
| $x^d$ | Desired trajectory defined by waypoints p relative to the estimated object states $\tilde{x}$. |
| P | Weighting matrix for tracking. This is a positive definite, diagonal matrix that represents the penalty or cost incurred by deviating from a particular state. Some formulations only consider tracking the position of the system, making $P \in \mathbb{R}^{3 \times 3}$ |
| Q | Weighting matrix for control effort. This is a positive definite, diagonal matrix that represents the penalty or cost incurred by |

TABLE 1-continued

Parameter Definitions in Eqs. (9) and (10)

| Variable | Definition |
|---|---|
| | exerting control effort. Some formulations utilize control only in x-, y-, and z-axes as well as in the azimuth of the system, making $Q \in \mathbb{R}^{4 \times 4}$ |

Initial results showed the planned trajectory appeared to have minimal redundancy in view coverage, and the group of five images selected by the image selection algorithm looked fairly diverse and independent, which supports the goal of object identification.

The framework was tested in a simulation example with a vehicle of interest that was artificially tracked (with simulated measurement noise). FIG. 23 shows the resulting trajectory and path 2302 and images acquired by the system tracking and spiraling about the moving object. The dashed line 2304 represents the simulated moving object, which was moving in one direction at varying speeds. The desired path of the system 100 at any point is shown by the light dashed lines 2306 near each trajectory point. The desired path is adjusted and executed by the short-term planning module 156 resulting in the motion represented in the heavy line 2302 extending from each point. The trajectory is updated at each of the points along the trajectory. The x- and y-axes represent the x and y position in meters. The image selection algorithm in the vision-based navigation system 150 further identified the five most informative images from the data collected (selected images in FIG. 23 have thick borders).

A simulation of the tracking algorithm in the vision processing module 154 of the vision-based navigation system 150 utilizing STRUCK was performed. In this simulated environment, the implementation of the vision processing module 154 communicates with other components of the simulation via a message passing mechanism. The vision processing module 154 first processes imagery from the virtual gimbaled imaging system on the virtual sUAV. Then, the module 154 estimates the location of the simulated moving vehicle 2402 in the scene in pixel space. Finally, the module 154 sends the resulting motion commands to component of the vision-based guidance system 150 that controls the virtual sUAV and imaging system (i.e., the gimbal controller module 155, long-term planning module 152, or short-term planning module 156). In the simulation, the virtual system successfully processed imagery from the virtual gimbaled imaging device on the sUAV, estimate the location of the simulated moving vehicle 2402 in the scene in pixel space, and then send the result back to the components of the vision-based guidance system 150 that control motion of the virtual system and imaging device.

FIGS. 24A-24F illustrate example simulation results of tracking and maneuvering of the system 100 around a simulated moving vehicle 2402 purely using vision-based feedback according to the disclosure herein. The virtual system was able to track the vehicle 2402 and keep it in the field of view while observing the object of interest from varying viewing angles.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps may be replaced with a single element, component, or step. Likewise, a single element, component, or step may be replaced with a plurality of elements, components, or steps that serve the same purpose. Moreover, while exemplary embodiments have been shown and described with references to particular embodiments thereof, those of ordinary skill in the art understand that various substitutions and alterations in form and detail may be made therein without departing from the scope of the present disclosure. Further still, other aspects, functions, and advantages are also within the scope of the present disclosure.

Exemplary flowcharts are provided herein for illustrative purposes and are non-limiting examples of methods. One of ordinary skill in the art recognizes that exemplary methods may include more or fewer steps than those illustrated in the exemplary flowcharts, and that the steps in the exemplary flowcharts may be performed in a different order than the order shown in the illustrative flowcharts.

The invention claimed is:

1. An autonomous vehicle system, comprising:
   a chassis including one or more motors;
   an imaging system attached to the chassis;
   a vision-based guidance system including a memory and at least one of a central processing unit (CPU) or a graphics processing unit (GPU) configured to:
     acquire images of an object of interest using the imaging system;
     analyze the images of the object to determine an object position and an object size relative to the imaging system;
     determine a path and trajectory of the autonomous vehicle system relative to the object of interest, the trajectory identifying a sequence of waypoints and the path identifying a route through the sequence of waypoints, each waypoint indicating a position in space relative to the object of interest, at least one waypoint in the sequence of waypoints identifying a distance and specific viewing angle from the autonomous vehicle to the object of interest; and
     control the one or more motors to move the autonomous vehicle system along the trajectory while keeping the object of interest in view of the imaging system.

2. The system of claim 1, wherein analyzing the images of the object of interest to determine the object position and the object size relative to the imaging system includes updating an object model based on at least a portion of the acquired images using a discriminative learning-based tracking algorithm.

3. The system of claim 2, wherein the vision-based guidance system is further configured to:
   compute a tracking confidence score between at least a first image and a second image as determined by the discriminative learning-based tracking algorithm;
   in response to the tracking confidence score being greater than or equal to a threshold value, update the object model using the second image using the discriminative learning-based tracking algorithm; and
   in response to the tracking confidence score being less than the threshold value, halt updating the object model.

4. The system of claim 3, wherein the tracking confidence score is a rate of change of a score output by the discriminative learning-based tracking algorithm.

5. The system of claim 4, wherein the discriminative learning-based tracking algorithm is a support vector machine.

6. The system of claim 3, wherein the vision-based guidance system is further configured to:
   automatically enter a search mode to reacquire the object of interest in an image in response to the tracking confidence score being less than the threshold value.

7. The system of claim 2, wherein the vision-based guidance system is further configured to apply a feature-based matching algorithm to the images to compensate for relative motion of the imaging system with respect to the object of interest.

8. The system of claim 1, further comprising an altimeter.

9. The system of claim 1, wherein the vision-based guidance system is configured to communicate with a remote operator to send or receive information related to the object of interest including images.

10. The system of claim 1, wherein the imaging system is attached to a gimbal of the chassis.

11. The system of claim 10, wherein the vision-based guidance system is further configured to move the imaging system using the gimbal to keep the object of interest in view of the imaging system.

12. The system of claim 1, wherein the vision-based guidance system is implemented entirely onboard the chassis.

13. The system of claim 1, wherein determining a trajectory relative to an object of interest includes:
   computing a variation of information metric using one or more of the acquired images of the object of interest;
   determining a waypoint based on a measure of information gain; and
   planning a path to reach the waypoint.

14. The system of claim 13, wherein determining a waypoint based on a measure of information gain includes:
   accessing a lookup table specific to a class of the object of interest; and
   identifying the waypoint corresponding to the estimated next-best view in the lookup table based upon the current location of the autonomous vehicle system in relation to the object of interest.

15. The system of claim 14, wherein the class of the object of interest is at least one of a building, a vehicle, an individual, or a natural feature.

16. The system of claim 13, wherein determining a waypoint based on a measure of information gain includes:
   selecting the waypoint from a pre-determined path.

17. A method of autonomously tracking an object of interest, comprising:
   acquiring images of the object of interest using an imaging system attached to a chassis of an autonomous vehicle system, the chassis including one or more motors;
   analyzing the images of the object of interest to determine an object position and an object size relative to the imaging system;
   determining a path and trajectory of the autonomous vehicle system relative to the object of interest, the trajectory identifying a sequence of waypoints and the path identifying a route through the sequence of waypoints, each waypoint indicating a position in space relative to the object of interest, at least one waypoint in the sequence of waypoints identifying a distance and specific viewing angle from the autonomous vehicle to the object of interest; and controlling the one or more motors to move the chassis along the trajectory while keeping the object of interest in view of the imaging system.

18. The method of claim 17, wherein analyzing the images of the object of interest to determine the object position and the object size relative to the imaging system includes updating an object model based on at least a portion of the acquired images using a discriminative learning-based tracking algorithm.

19. The method of claim 18, further comprising
computing a tracking confidence score between at least a first image and a second image in the as determined by the discriminative learning-based tracking algorithm;
in response to the tracking confidence score being greater than or equal to a threshold value, updating the object model using the second image using the discriminative learning-based tracking algorithm; and
in response to the tracking confidence score being less than the threshold value, halt updating the object model.

20. The method of claim 19, wherein the tracking confidence score is a rate of change of a score output by the discriminative learning-based tracking algorithm.

21. The method of claim 20, wherein the discriminative learning-based tracking algorithm is a support vector machine.

22. The method of claim 19, further comprising automatically entering a search mode to reacquire the object of interest in an image in response to the tracking confidence score being less than the threshold value.

23. The method of claim 17, further comprising applying a feature-based matching algorithm to the images to compensate for relative motion of the imaging system with respect to the object of interest.

24. The method of claim 17 wherein determining a trajectory relative to an object of interest includes:
computing a variation of information metric using one or more of the acquired images of the object of interest;
determining a waypoint based on a measure of information gain; and
planning a path to reach the waypoint.

25. The method of claim 24, wherein determining a waypoint based on a measure of information gain includes:
accessing a lookup table specific to a class of the object of interest; and
identifying the waypoint corresponding to the estimated next-best view in the lookup table based upon the current location of the autonomous vehicle system in relation to the object of interest.

26. The method of claim 25, wherein the class of the object of interest is at least one of a building, a vehicle, an individual, or a natural feature.

27. The method of claim 24, wherein determining a waypoint based on a measure of information gain includes:
selecting the waypoint from a pre-determined path.

28. The method of claim 17, further comprising moving the imaging system using a gimbal of the chassis to keep the object of interest in view of the imaging system.

* * * * *